US009963568B2

(12) United States Patent
Nakatsuji et al.

(10) Patent No.: US 9,963,568 B2
(45) Date of Patent: May 8, 2018

(54) FOAMING AGENT AND MANUFACTURING METHOD FORMING AGENT THEREFOR, RUBBER COMPOSITION, CROSS-LINKED FOAM AND MANUFACTURING METHOD THEREFOR, AND RUBBER MOLDED ARTICLE

(71) Applicant: MITSUI CHEMICALS, INC., Tokyo (JP)

(72) Inventors: Ryo Nakatsuji, Ichihara (JP); Hiroki Ebata, Yokohama (JP); Yuji Ishii, Kisarazu (JP); Kiyohide Inomata, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days. days.

(21) Appl. No.: 15/639,729

(22) Filed: Jun. 30, 2017

(65) Prior Publication Data
US 2017/0298203 A1 Oct. 19, 2017

Related U.S. Application Data

(62) Division of application No. 13/980,181, filed as application No. PCT/JP2012/051654 on Jan. 26, 2012.

(30) Foreign Application Priority Data

| Jan. 28, 2011 | (JP) | 2011-016359 |
| Jan. 28, 2011 | (JP) | 2011-016360 |
| Sep. 12, 2011 | (JP) | 2011-198642 |
| Sep. 12, 2011 | (JP) | 2011-198643 |
| Sep. 12, 2011 | (JP) | 2011-198644 |

(51) Int. Cl.
*C08J 9/00* (2006.01)
*C08J 9/04* (2006.01)
*C08J 9/12* (2006.01)
*C08J 9/14* (2006.01)
*C08L 21/00* (2006.01)
*C08L 23/16* (2006.01)

(52) U.S. Cl.
CPC .............. *C08J 9/142* (2013.01); *C08J 9/125* (2013.01); *C08L 21/00* (2013.01); *C08L 23/16* (2013.01); *C08J 2307/00* (2013.01); *C08J 2321/00* (2013.01); *C08J 2323/16* (2013.01); *C08L 2203/14* (2013.01); *C08L 2312/00* (2013.01)

(58) Field of Classification Search
CPC .............. C08J 2205/022; C08J 2300/26; C08J 2203/10
See application file for complete search history.

(56) References Cited

U.S. PATENT DOCUMENTS

| 4,394,930 A | 7/1983 | Korpman |
| 5,434,194 A | 7/1995 | Fujimoto et al. |
| 5,607,629 A | 3/1997 | DeMello et al. |
| 5,788,889 A | 8/1998 | DeMello et al. |
| 6,358,580 B1 * | 3/2002 | Mang ............... C08L 21/00 428/304.4 |
| 6,615,539 B1 | 9/2003 | Obonai et al. |
| 2011/0233448 A1 * | 9/2011 | Ebata ............... C08L 23/16 252/62 |

FOREIGN PATENT DOCUMENTS

| EP | 1 145 621 A1 | 10/2001 | |
| JP | 51-112875 | 10/1976 | |
| JP | 55-158009 A | 12/1980 | |
| JP | 04-331247 | 11/1992 | |
| JP | 05-320400 | 3/1993 | |
| JP | 5-146312 | 6/1993 | |
| JP | T 6-507128 | 8/1994 | |
| JP | 06-345889 | 12/1994 | |
| JP | H08-27300 | * 1/1996 | ............... C08J 9/06 |
| JP | 08-216220 | 9/1996 | |
| JP | 2000-336337 | 12/2000 | |
| JP | 2001-049020 | 2/2001 | |
| JP | 2007-160789 | 6/2007 | |
| JP | 2009-119817 | 6/2009 | |

(Continued)

OTHER PUBLICATIONS

International Search Report PCT/JP2012/051654 dated Apr. 24, 2012.
Office Action received in Japanese Patent Application No. 2012-554835 dated Jul. 22, 2014.
Data Sheet for Isobam, Kl Gel. Kuraray Co. 1997.
Extended European Search Report issued in application No. 12739272.8 dated Sep. 2, 2015.
Restriction Requirement issued in U.S. Appl. No. 13/980,181 dated Jul. 10, 2015.
Non-Final Office Action issued in U.S. Appl. No. 13/980,181 dated Oct. 27, 2015.
Final Office Action issued in U.S. Appl. No. 13/980,181 dated Feb. 25, 2016.

(Continued)

*Primary Examiner* — Kara B Boyle
(74) *Attorney, Agent, or Firm* — Foley & Lardner LLP

(57) ABSTRACT

[Object] To provide an excellent foaming agent which does not have problems in handling and operation (example: risk of explosion or fire) and inhibition of cross-linking resulting from a foaming agent and problems, such as, mold pollution and environmental pollution, caused by a foaming agent residue, which has excellent uniform dispersibility in a subject of foaming, and which can be used as an alternative to the chemical decomposition type foaming agent.
[Solution] A foaming agent formed from at least (A) a high molecular weight compound having a saturated water absorption of 10 to 1,000 g/g in ion-exchanged water (25° C.) and (B) water, wherein a storage modulus (G') of the agent, determined on the basis of a viscoelasticity measurement at a temperature of 20° C., is $8.0 \times 10^1$ to $1.0 \times 10^6$ Pa at a frequency of 5 rad/s.

3 Claims, 1 Drawing Sheet

(56) References Cited

FOREIGN PATENT DOCUMENTS

JP       2010-095653 A      4/2010
WO       WO 98/49212        11/1998
WO       WO 2010/064574 A1 *  6/2010

OTHER PUBLICATIONS

Non-Final Office Action issued in U.S. Appl. No. 13/980,181 dated Sep. 6, 2016.
Final Office Action issued in U.S. Appl. No. 13/980,181 dated Mar. 30, 2017.

* cited by examiner

[Figure 1]
(a)
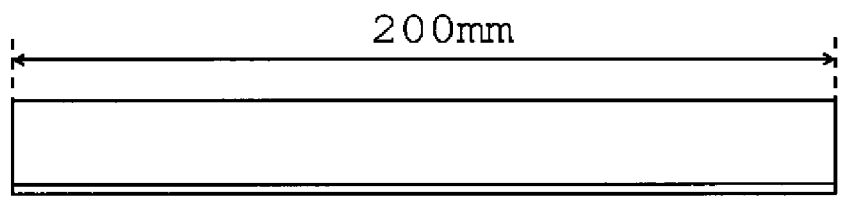
(b)
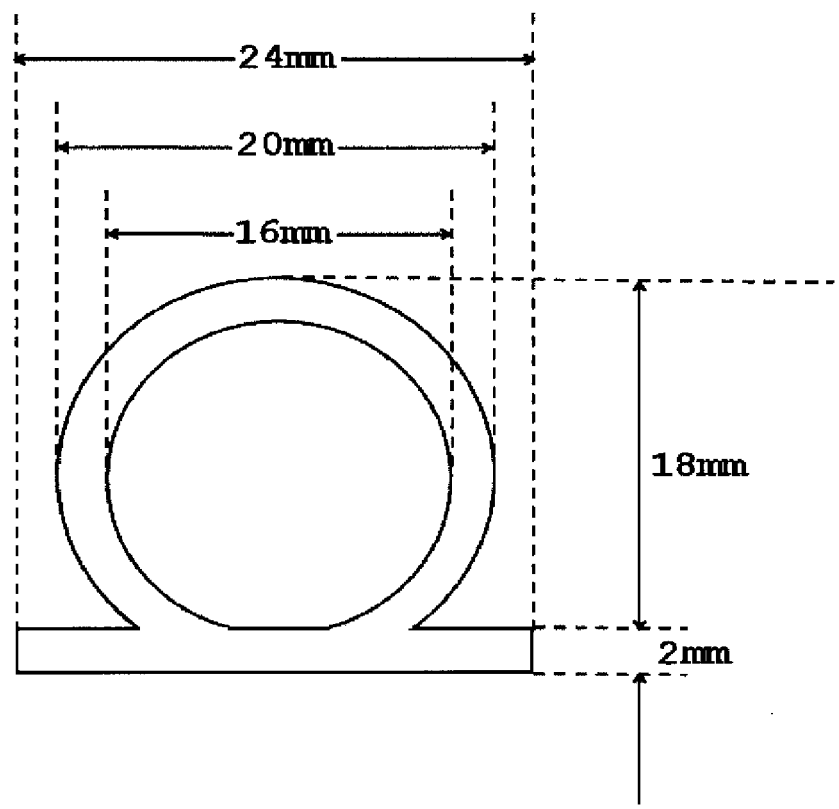

FOAMING AGENT AND MANUFACTURING METHOD FORMING AGENT THEREFOR, RUBBER COMPOSITION, CROSS-LINKED FOAM AND MANUFACTURING METHOD THEREFOR, AND RUBBER MOLDED ARTICLE

CROSS-REFERENCE TO RELATED APPLICATIONS

This application is a divisional of U.S. patent application Ser. No. 13/980,181, filed on Jul. 17, 2013, which is a National Stage Entry of International Application No. PCT/JP2012/051654, filed on Jan. 26, 2012, which claims the benefit of Japanese Patent Application No. 2011-016359, filed on Jan. 28, 2011; Japanese Patent Application No. 2011-016360, filed on Jan. 28, 2011; Japanese Patent Application No. 2011-198642, filed on Sep. 12, 2011; Japanese Patent Application No. 2011-198643, filed on Sep. 12, 2011; and Japanese Patent Application No. 2011-198644, filed on Sep. 12, 2011, the disclosures of which are hereby incorporated by reference in their entireties.

TECHNICAL FIELD

The present invention relates to a foaming agent, a method for manufacturing a foaming agent and a forming agent for the foaming agent, a rubber composition, a cross-linked foam and a manufacturing method therefor, and a rubber molded article (example: an automobile weather strip sponge, an automobile cushioning material, and an automobile heat insulating material).

BACKGROUND ART

Hitherto, various foamed materials have been industrially widely produced and sold. Typical examples of foamed materials include foamed materials of rubber having both the flexibility and sealing properties. Production of a foamed material of rubber usually includes a step of cross-linking and foaming a raw material rubber composition.

In the above-described foaming, a chemical decomposition type foaming agent, which generates a gas by decomposition due to heating, has been used. Known examples of various foaming agents include azodicarbonamide (ADCA), N,N'-dinitrosopentamethylenetetramine (DPT), and 4,4'-oxybis(benzenesulfonyl hydrazide) (OBSH) (refer to PTL 1 and PTL 2, for example).

However, the chemical decomposition type foaming agent has problems, such as, inhibition of cross-linking resulting from a foaming agent, and mold pollution and environmental pollution caused by a foaming agent residue. In particular, DPT is a substance which in itself has a risk of explosion or fire and which is suspected of having a possibility of becoming a mutagen and, therefore, has a drawback that the safety for a human body is poor. Consequently, development of an excellent foaming agent which does not have the above-described problems and which can be used as an alternative to the chemical decomposition type foaming agent has been desired.

Meanwhile, a method for manufacturing a foamed material of a thermoplastic elastomer by using water as a foaming agent has been known (refer to PTL 3 and PTL 4, for example). In these Patent Literatures, the subject of foaming is a thermoplastic elastomer, and a predetermined foam-molded material is prepared by pressing water serving as a foaming agent into an extruder.

CITATION LIST

Patent Literature

PTL 1: JPA 2000-336337
PTL 2: JPA 2001-049020
PTL 3: JPA 1996-216220
PTL 4: JPA 1994-507128

SUMMARY OF INVENTION

Technical Problem

The present inventors have studied on use of water as a foaming agent for rubber foaming. However, it was found that water was not able to be used alone as a foaming agent for rubber foaming because the uniform dispersibility of water in a raw material rubber composition (unvulcanized rubber) of a cross-linked rubber material was very low.

A first issue of the present invention is to provide an excellent water foaming agent which does not have problems, such as, risks of handling and operation (example: risk of explosion or fire) and inhibition of cross-linking resulting from a foaming agent, and mold pollution and environmental pollution caused by a foaming agent residue, which has excellent uniform dispersibility in a subject of foaming (example: raw material rubber composition of cross-linked rubber material), and which can be used as an alternative to a chemical decomposition type foaming agent. The issue is also to provide a rubber composition in which the water foaming agent is uniformly dispersed and which can be foam-molded.

In this regard, in the case where water is used as the foaming agent, water has a large evaporation rate, so that it is difficult to control the foaming rate and, in many cases, outgassing may occur during foaming. (1) For example, in the case of extrusion foam molding, outgassing from a surface layer of a molded material occurs easily and, as a result, the appearance of a cross-linked foam tends to become worse. (2) For example, in the case of in-mold foam molding, rapid evaporation of water (foaming) occurs easily nearby a mold and, thereby, it may become difficult to reduce the specific gravity of the resulting molded material sufficiently (example: 0.7 or less). (3) For example, in the case of molding, excellent fluidity is required of a rubber composition from the viewpoints of precision moldability and productivity.

A second issue of the present invention is to further improve various performances of a rubber composition including the water foaming agent in foam molding, e.g., extrusion foam molding, the appearance of the resulting molded material, and the like.

A third issue of the present invention is to further improve various performances of a rubber composition including the water foaming agent in foam molding, e.g., in-mold foam molding, the lightweightness of the resulting molded material, and the like.

A fourth issue of the present invention is to further improve various performances of a rubber composition including the water foaming agent in molding and the like (example: fluidity in injection and foamability in foam molding), the appearance of the resulting molded material, and the like.

Solution to Problem

The present inventors performed intensive research to solve the above-described issues on the basis of the above-described findings. As a result, the present inventors have found that a water foaming agent having the following configuration has excellent uniform dispersibility in a subject of foaming (example: raw material rubber composition of cross-linked rubber material) and, therefore, the first issue is able to be solved. Consequently the present invention has been completed.

In addition, the present inventors have found that rubber compositions having the configurations according to the items [9] to [11], [12] to [14], and [15] to [17] are, respectively, able to be favorably subjected to the extrusion foam molding, the in-mold foam molding, the molding, and the like and, therefore, the second issue, the third issue, and the fourth issue are able to be solved. Consequently the present inventions have been completed.

[1] A foaming agent formed from at least (A) a high molecular weight compound having a saturated water absorption of 10 to 1,000 g/g in ion-exchanged water (25° C.) and (B) water, wherein a storage modulus (G') of the agent, determined on the basis of a viscoelasticity measurement at a temperature of 20° C., is $8.0 \times 10^1$ to $1.0 \times 10^6$ Pa at a frequency of 5 rad/s.

[2] The foaming agent according to the item [1], wherein the high molecular weight compound (A) has a saturated water absorption of 250 to 1,000 g/g in ion-exchanged water (25° C.).

[3] The foaming agent according to the item [1] or item [2], which is a foaming agent for rubber foaming.

[4] The foaming agent according to any one of the items [1] to [3], wherein the high molecular weight compound (A) is a carboxyl group-containing high molecular weight compound exhibiting a hydrogel-forming property.

[5] The foaming agent according to any one of the items [1] to [4], wherein the water content is 99.85 to 70 percent by mass.

[6] A method for manufacturing the foaming agent according to the item [1], the method including the step of mixing (A) a high molecular weight compound having a saturated water absorption of 10 to 1,000 g/g in ion-exchanged water (25° C.) and (B) water.

[7] A forming agent for the foaming agent according to the item [1], including (A) a high molecular weight compound having a saturated water absorption of 10 to 1,000 g/g in ion-exchanged water (25° C.)

[8] A rubber composition including 100 parts by mass of (I) at least one type of rubber component selected from natural rubber and synthetic rubber and 0.5 to 300 parts by mass of (II) the foaming agent according to any one of the items [1] to [5].

[9] A rubber composition including 100 parts by mass of (I-1) an ethylene.α-olefin.nonconjugated polyene random copolymer and 0.5 to 300 parts by mass of (II) the foaming agent according to any one of the items [1] to [5], wherein 50 percent by mass or more of the copolymer (I-1) is a copolymer (X) containing structural units [A] derived from ethylene, structural units [B] derived from an α-olefin having the carbon number of 3 to 20, structural units [C-1] derived from a nonconjugated polyene, in which among carbon.carbon double bonds, only one carbon.carbon double bond polymerizable with a metallocene catalyst is present in one molecule, and structural units [C-2] derived from a nonconjugated polyene, in which among the carbon-.carbon double bonds, two carbon.carbon double bonds polymerizable with a metallocene catalyst are present in one molecule, and satisfying the following requirements (1) to (3), (1) the content of the structural units [B] is 10 to 50 percent by mole in 100 percent by mole of the total structural units of the copolymer (X), (2) the total content of the structural units [C-1] and the structural units [C-2] is 1.0 to 6.0 percent by mole in 100 percent by mole of the total structural units of the copolymer (X), and (3) the limiting viscosity [η] measured in a decalin solution at 135° C. is 2.0 to 4.0 dL/g.

[10] The rubber composition according to the item [9], wherein in the copolymer (X), at least part of the structural units [C-1] are structural units derived from 5-ethylidene-2-norbornene (ENB) and the content of structural units derived from ENB is 1 to 5 percent by mole in 100 percent by mole of the total structural units of the copolymer (X), and at least part of the structural units [C-2] are structural units derived from 5-vinyl-2-norbornene (VNB) and the content of structural units derived from VNB is 0.01 to 0.45 percent by mole in 100 percent by mole of the total structural units of the copolymer (X).

[11] The rubber composition according to the item [9] or item [10], which is a rubber composition for extrusion foam molding.

[12] A rubber composition including 100 parts by mass of (I-1) an ethylene.α-olefin.nonconjugated polyene random copolymer and 0.5 to 300 parts by mass of (II) the foaming agent according to any one of the items [1] to [5], wherein 50 percent by mass or more of the copolymer (I-1) is a copolymer (Y) containing structural units [A'] derived from ethylene, structural units [B'] derived from an α-olefin having the carbon number of 3 to 20, structural units [C-1'] derived from a nonconjugated polyene, in which among carbon.carbon double bonds, only one carbon.carbon double bond polymerizable with a metallocene catalyst is present in one molecule, and structural units [C-2'] derived from a nonconjugated polyene, in which among the carbon-.carbon double bonds, two carbon.carbon double bonds polymerizable with a metallocene catalyst are present in one molecule, and satisfying the following requirements (4) to (6), (4) the content of the structural units [B'] is 10 to 50 percent by mole in 100 percent by mole of the total structural units of the copolymer (Y), (5) the total content of the structural units [C-1'] and the structural units [C-2'] is 1.0 to 6.0 percent by mole in 100 percent by mole of the total structural units of the copolymer (Y), and (6) the limiting viscosity [η] measured in a decalin solution at 135° C. is 0.8 to 1.8 dL/g.

[13] The rubber composition according to the item [12], wherein in the copolymer (Y), at least part of the structural units [C-1'] are structural units derived from 5-ethylidene-2-norbornene (ENB) and the content of structural units derived from ENB is 1 to 5 percent by mole in 100 percent by mole of the total structural units of the copolymer (Y), and at least part of the structural units [C-2'] are structural units derived from 5-vinyl-2-norbornene (VNB) and the content of structural units derived from VNB is 0.01 to 0.45 percent by mole in 100 percent by mole of the total structural units of the copolymer (Y).

[14] The rubber composition according to the item [12] or item [13], which is a rubber composition for in-mold foam molding.

[15] A rubber composition including 100 parts by mass of (I-1) an ethylene.α-olefin.nonconjugated polyene random copolymer and 0.5 to 300 parts by mass of (II) the foaming agent according to any one of the items [1] to [5], wherein 10 to 50 percent by mass of the copolymer (I-1) is a copolymer (X) containing structural units [A] derived from ethylene, structural units [B] derived from an α-olefin having the carbon number of 3 to 20, structural units [C-1] derived from a nonconjugated polyene, in which among carbon.carbon double bonds, only one carbon.carbon double bond polymerizable with a metallocene catalyst is present in one molecule, and structural units [C-2] derived from a nonconjugated polyene, in which among the carbon.carbon double bonds, two carbon.carbon double bonds polymerizable with a metallocene catalyst are present in one molecule, and satisfying the following requirements (1) to (3), and wherein 90 to 50 percent by mass of the copolymer (I-1) is a copolymer (Y) containing structural units [A'] derived from ethylene, structural units [B'] derived from an α-olefin having the carbon number of 3 to 20, structural units [C-1'] derived from a nonconjugated polyene, in which among carbon.carbon double bonds, only one carbon.carbon double bond polymerizable with a metallocene catalyst is present in one molecule, and structural units [C-2'] derived from a nonconjugated polyene, in which among the carbon.carbon double bonds, two carbon.carbon double bonds polymerizable with a metallocene catalyst are present in one molecule, and satisfying the following requirements (4) to (6), (1) the content of the structural units [B] is 10 to 50 percent by mole in 100 percent by mole of the total structural units of the copolymer (X), (2) the total content of the structural units [C-1] and the structural units [C-2] is 1.0 to 6.0 percent by mole in 100 percent by mole of the total structural units of the copolymer (X), (3) the limiting viscosity [η] measured in a decalin solution at 135° C. is 2.0 to 4.0 dL/g, (4) the content of the structural units [B'] is 10 to 50 percent by mole in 100 percent by mole of the total structural units of the copolymer (Y), (5) the total content of the structural units [C-1'] and the structural units [C-2'] is 1.0 to 6.0 percent by mole in 100 percent by mole of the total structural units of the copolymer (Y), and (6) the limiting viscosity [η] measured in a decalin solution at 135° C. is 0.8 to 1.8 dL/g.

[16] The rubber composition according to the item [15], wherein in the copolymer (X), at least part of the structural units [C-1] are structural units derived from 5-ethylidene-2-norbornene (ENB) and the content of structural units derived from ENB is 1 to 5 percent by mole in 100 percent by mole of the total structural units of the copolymer (X), and at least part of the structural units [C-2] are structural units derived from 5-vinyl-2-norbornene (VNB) and the content of structural units derived from VNB is 0.01 to 0.45 percent by mole in 100 percent by mole of the total structural units of the copolymer (X), and in the copolymer (Y), at least part of the structural units [C-1'] are structural units derived from 5-ethylidene-2-norbornene (ENB) and the content of structural units derived from ENB is 1 to 5 percent by mole in 100 percent by mole of the total structural units of the copolymer (Y), and at least part of the structural units [C-2'] are structural units derived from 5-vinyl-2-norbornene (VNB) and the content of structural units derived from VNB is 0.01 to 0.45 percent by mole in 100 percent by mole of the total structural units of the copolymer (Y).

[17] The rubber composition according to the item [15] or item [16], which is a rubber composition for molding.

[18] The rubber composition according to any one of the items [8] to [17], further including a cross-linking agent.

[19] A cross-linked foam produced by cross-linking foam molding the rubber composition according to any one of the items [8] to [18].

[20] A rubber molded article including the cross-linked foam according to the item [19].

[21] An automobile weather strip sponge, an automobile cushioning material, or an automobile heat insulating material including the cross-linked foam according to the item [19].

[22] A method for manufacturing a cross-linked foam, including the steps of extruding the rubber composition according to any one of the items [9] to [11] by an extrusion molding method and heating the resulting extrusion molded material to induce cross-linking and foaming.

[23] A method for manufacturing a cross-linked foam, including a first foaming step to fill the rubber composition according to any one of the items [12] to [14] into a primary mold, perform heating under pressure and, subsequently, reduce the pressure to induce foaming and a second foaming step to put the primary foamed material obtained by the first foaming step into a secondary mold and perform heating at normal pressure to induce foaming.

[24] A method for manufacturing a cross-linked foam including the steps of injecting the rubber composition according to any one of the items [15] to [17] into a mold by a molding method and performing heating in the mold to induce cross-linking and foaming.

Advantageous Effects of Invention

According to the present invention, it is possible to provide an excellent water foaming agent which does not have problems, such as, risks of handling and operation (example: risk of explosion or fire) and inhibition of cross-linking resulting from a foaming agent, and mold pollution and environmental pollution caused by a foaming agent residue, which has excellent uniform dispersibility in a subject of foaming (example: raw material rubber composition of cross-linked rubber material), and which can be used as an alternative to the chemical decomposition type foaming agent. It is also possible to provide a rubber composition in which the water foaming agent is uniformly dispersed and which can be foam-molded.

According to the items [9] to [11] of the present invention, it is possible to provide a rubber composition including a specific water foaming agent, wherein even in the case of, for example, extrusion foam molding, outgassing from a surface layer of a molded material is suppressed and a cross-linked foam having excellent appearance can be obtained.

According to the items [12] to [14] of the present invention, it is possible to provide a rubber composition including a specific water foaming agent, wherein in the case of, for example, in-mold foam molding, outgassing is suppressed during foaming, and a cross-linked foam having a sufficiently small specific gravity (example: 0.7 or less) can be obtained.

According to the items [15] to [17] of the present invention, it is possible to provide a rubber composition including a specific water foaming agent, wherein excellent fluidity is exhibited, and in the case of, for example, molding, cross-linked foam exhibiting excellent appearance of an end portion surface can be obtained, while outgassing is suppressed during foaming.

BRIEF DESCRIPTION OF DRAWINGS

FIG. 1 is a schematic diagram of a mold used in production of a tube-shaped sponge in an example.

DESCRIPTION OF EMBODIMENTS

The present invention will be described below in detail.
[Foaming Agent]
A foaming agent according to the present invention is formed from at least (A) a high molecular weight compound having a saturated water absorption of 10 to 1,000 g/g in ion-exchanged water (25° C.) and (B) water and has a specific storage modulus (G'). In this regard, hereafter the foaming agent according to the present invention may be referred to as "Foaming agent A", and the individual components may be referred to as "High molecular weight compound (A)" and "Water (B)", respectively.

The storage modulus (G') at a frequency of 5 rad/s of Foaming agent A determined on the basis of a viscoelasticity measurement at a temperature of 20° C. is $8.0 \times 10^1$ to $1.0 \times 10^6$ Pa, preferably $8.0 \times 10^1$ to $8.0 \times 10^5$ Pa, and more preferably $1.0 \times 10^2$ to $5.0 \times 10^5$ Pa. The detailed measurement condition of the storage modulus (G') is as described in the examples.

The storage modulus (G') of Foaming agent A falls within the range. Therefore, Foaming agent A has excellent uniform dispersibility in a raw material rubber composition of a cross-linked rubber material. If the storage modulus (G') exceeds the range, the foaming agent becomes a foreign matter in the raw material rubber composition and may cause significant degradation in the appearance. If the storage modulus (G') is less than the range, the foaming agent is not easily uniformly dispersed into the raw material rubber composition and defective foaming (irregular foaming or the like) may be induced.

In the present invention, a term "cross-linked rubber" refers to rubber which has been cross-linked. A term "raw material rubber composition of a cross-linked rubber material" refers to a crude rubber composition before being cross-linked, which exhibits rubber elasticity after being cross-linked, and may be simply referred to as "rubber composition".

The water content of Foaming agent A is preferably 99.85 to 70 percent by mass, more preferably 99.8 to 75 percent by mass, further preferably 99.8 to 80 percent by mass, particularly preferably 99.8 to 90.0 percent by mass, and most preferably 99.8 to 99.0 percent by mass. The water content is determined from, for example, a blending ratio of High molecular weight compound (A) to Water (B), and details thereof are as described in the examples.

In the case where the water content is within the range, the balance between the handleability of the foaming agent and the amount of generation of gas is excellent. If the water content is more than the range, the amount of generation of gas is small in relation to the mass, large amounts of foaming agent is required, and degradation in the properties may be induced. If the water content is less than the range, the handleability of the foaming agent in itself may be degraded.

In Foaming agent A according to the present invention, High molecular weight compound (A) is usually in the state of gel because of Water (B). Therefore, Foaming agent A usually has a hydrogel type structure.

According to the studies of the preset inventors, water is hardly dispersed into the raw material rubber composition of a cross-linked rubber material and it has been very difficult to use water as a foaming agent for rubber foaming.

However, in the present invention, water is used in a special state, that is, a form of the above-described foaming agent. The present inventors have found that the foaming agent concerned has excellent uniform dispersibility in the raw material rubber composition of a cross-linked rubber material and, as a result, the uniform dispersibility of water in the raw material rubber composition of a cross-linked rubber material is improved considerably.

Therefore, Foaming agent A (water contained in A concerned) is very suitable for the foaming agent for rubber foaming. Examples of advantages thereof include that (1) there is no risk of explosion or fire in handling and operation, (2) a foamed material having excellent properties (example: compressive stress) is obtained because there is no inhibition of cross-linking resulting from a foaming agent, and (3) there is no mold pollution and environmental pollution caused by a foaming agent residue because water having no staining property is used as a foaming agent and use of a chemical decomposition type foaming agent can be reduced.

Meanwhile, the shape of Foaming agent A is not specifically limited and may be selected appropriately in accordance with the use thereof (example: uses of rubber composition including Foaming agent A) and the production condition. For example, a massive shape is mentioned.

<High Molecular Weight Compound (A)>

The saturated water absorption of High weight molecular compound (A) in ion-exchanged water (25° C.) is 10 to 1,000 g/g, preferably 20 to 1,000 g/g, more preferably 50 to 1,000 g/g, further preferably 250 to 1,000 g/g, and most preferably 300 to 1,000 g/g. The detailed measurement condition of the saturated water absorption is as described in the examples.

In the case where the saturated water absorption of High molecular weight compound (A) is within the range, Foaming agent A exhibits excellent water retentivity. Consequently, when the foaming agent concerned is dispersed into the raw material rubber composition of a cross-linked rubber material, favorably, water is not released. In particular, it is favorable that the saturated water absorption of High molecular weight compound (A) is 250 g/g or more because the dispersibility of the foaming agent in the raw material rubber composition of a cross-linked rubber material is improved.

The shape of High molecular weight compound (A) in preparation of Foaming agent A is not specifically limited and may be selected appropriately in accordance with the use of the foaming agent. For example, particulate shapes are mentioned. Among them, particles having a weight average particle diameter of 200 to 10,000 μm are preferable.

Examples of High molecular weight compounds (A) include high molecular weight compounds having a cross-linked structure and/or a network structure and having a property capable of forming hydrogel by holding water on the basis of the structure concerned (in the inside thereof), that is, high molecular weight compounds exhibiting a hydrogel-forming property. The term "hydrogel" refers to gel including at least a cross-linked structure and/or a network structure formed from a high molecular weight compound and water supported and/or held in the structure concerned.

The water is not specifically limited insofar as the water is supported and/or held as a liquid (liquid dispersion), which contains water as a primary component, in a cross-linked structure and/or a network structure. Examples of liquid dispersion include water in itself (example: pure water, e.g., distilled water and ion-exchanged water, and service water), aqueous solutions, and water-containing liquids (example: mixed liquids of water and monohydric or polyhydric alcohol and the like).

As for High molecular weight compound (A), from the viewpoint of water solubility or hydrophilicity, preferably high molecular weight compounds having an acid group and/or a salt thereof are mentioned, more preferably high weight molecular compounds having at least one type of functional group selected from a carboxyl group, an acid anhydride group, a sulfo group, a phosphate group and salts thereof (example: alkali metal salts, e.g., Na salts and K salts, and ammonium salts) are mentioned, and further preferably carboxyl group-containing high molecular weight compounds are mentioned.

In this regard, if the acidity of High molecular weight compound (A) is too high, inhibition of cross-linking may occur. Therefore, the pH of High molecular weight compound (A) (1 g of High molecular weight compound (A) is dispersed into 100 mL of ion-exchanged water, and a measurement is performed after standing for 1 hour) is preferably 4 to 9, more preferably 4.5 to 8.5, and further preferably 5 to 8.

Examples of methods for preparing High molecular weight compound (A) include (1) a method which includes polymerizing a polymerizable monomer in the presence of a copolymerizable cross-linking agent, so as to introduce a cross-linked structure, and (2) a method which includes subjecting a polymer obtained by polymerizing the polymerizable monomer or a known water-soluble or hydrophilic high molecular weight compound is subjected to a post-cross-linking treatment, so as to introduce a cross-linked structure. The method (1) is preferable as the method for preparing High molecular weight compound (A) because of ease in controlling the degree of polymerization and cross-linking density thereof. In addition, polysaccharide, polyvinyl alcohol, or the like can also be used as High molecular weight compound (A).

<<Method (1)>>

Examples of polymerizable monomers (where copolymerizable cross-linking agents described later are not included in the polymerizable monomers) include polymerizable monomers having an acid group. As for the polymerizable monomers, polymerizable monomers other than the polymerizable monomers having an acid group can also be mentioned.

Examples of polymerizable monomers having an acid group include polymerizable monomers having a carboxyl group, e.g., (meth)acrylic acid, crotonic acid, sorbic acid, maleic acid, itaconic acid, and cinnamic acid; polymerizable monomers having an acid anhydride group, e.g., maleic anhydride; polymerizable monomers having a sulfo group, e.g., vinyl sulfonic acid, allyl sulfonic acid, styrene sulfonic acid, vinyltoluene sulfonic acid, 2-(meth)acrylamide-2-methylpropane sulfonic acid, 2-(meth)acryloylethane sulfonic acid, and 2-(meth)acryloylpropane sulfonic acid; and polymerizable monomers having a phosphate group, e.g., 2-hydroxyethylacryloyl phosphate, 2-hydroxyethylmethacryloyl phosphate, phenyl-2-acryloyloxyethyl phosphate, and vinyl phosphoric acid. Among them, from the viewpoints of polymerizability and neutralizability, polymerizable monomers having a carboxyl group and polymerizable monomers having a sulfo group are preferable, polymerizable monomers having a carboxyl group are more preferable, and acrylic acid is particularly preferable.

One type of the polymerizable monomers having an acid group may be used alone, or at least two types may be used in combination. The polymerizable monomers having an acid group may be polymerized in the form of a salt thereof (example: alkali metal salts, e.g., Na salts and K salts, and ammonium salts), or a salt may be produced by neutralizing acid groups partly after polymerization.

Examples of other polymerizable monomers include alkyl or alkylene oxide ester of unsaturated carboxylic acids (example: (meth)acrylic acid, crotonic acid, sorbic acid, maleic acid, itaconic acid, and cinnamic acid), e.g., methyl (meth)acrylate, ethyl (meth)acrylate, methoxypolyethylene glycol (meth)acrylate, and polyethylene glycol mono(meth)acrylate; aromatic vinyl hydrocarbons, e.g., styrene; aliphatic vinyl hydrocarbons, e.g., ethylene, propylene, and butene; unsaturated nitrile compounds, e.g., acrylonitrile; and unsaturated amide compounds, e.g., acrylamide, methacrylamide, N-isopropylacrylamide, and N-vinylacetamide.

One type of the other polymerizable monomers may be used alone, or at least two types may be used in combination.

Examples of copolymerizable cross-linking agents include (1) compounds having at least two polymerizable double bonds (Copolymerizable cross-linking agent (1)) and (2) compounds having at least one polymerizable double bond and at least one functional group capable of reacting with the functional group (example: acid group) of the polymerizable monomer (Copolymerizable cross-linking agent (2)).

Examples of Copolymerizable cross-linking agents (1) include N,N'-methylenebis(meth)acrylamide, N,N'-ethylenebis(meth)acrylamide, ethylene glycol di(meth)acrylate, polyethylene glycol di(meth)acrylate, propylene glycol di(meth)acrylate, polypropylene glycol di(meth)acrylate, trimethylolpropane di(meth)acrylate, trimethylolpropane tri(meth)acrylate, ethylene oxide-modified trimethylolpropane tri(meth)acrylate, glycerol acrylate methacrylate, glycerol tri(meth)acrylate, pentaerythritol tetra(meth)acrylate, dipentaerythritol hexa(meth)acrylate, triallyl cyanurate, triallyl isocyanurate, triallyl phosphate, triallylamine, poly(meth)allyloxyalkane, divinylbenzene, divinyltoluene, divinylxylene, divinylnaphthalene, divinyl ether, divinyl ketone, trivinylbenzene, tolylene diisocyanate, and hexamethylene diisocyanate.

Examples of Copolymerizable cross-linking agents (2) include compounds having an epoxy group and a polymerizable double bond in the molecule, e.g., glycidyl (meth)acrylate; compounds having a hydroxy group and a polymerizable double bond in the molecule, e.g., N-methylol (meth)acrylamide; and primary to quaternary amino group-containing unsaturated compounds, e.g., N,N,N-trimethyl-N-(meth)acryloyloxyethyltrimethylammonium chloride, N,N,N-triethyl-N-(meth)acryloyloxyethyltrimethylammonium chloride, dimethylaminoethyl (meth)acrylate, diethylaminoethyl (meth)acrylate, allylamine, and vinyl pyridine.

Among the copolymerizable cross-linking agents, N,N'-methylenebisacrylamide is preferable.

Copolymerizable cross-linking agents may be used alone, or at least two types may be used in combination.

The usage of the copolymerizable cross-linking agent is usually 0.01 to 10 parts by mass, and preferably 0.1 to 5 parts by mass relative to 100 parts by mass of the polymerizable monomer. If the usage of the copolymerizable cross-linking agent is less than the range, the mechanical strength of High molecular weight compound (A) may become low and handling may become difficult. If the usage is more than the range, the saturated water absorption may be reduced.

<<Method (2)>>

Examples of methods usable as the method of the item (2) include a method in which a cross-linked structure is introduced in between polymer molecules by a heat treatment; a method in which a cross-linked structure is introduced in between polymer molecules by application of light, electron beams, γ-rays, or the like; and a method in which a cross-linked structure is introduced in between the polymer molecules by using a polyfunctional molecule having in the molecule a plurality of functional groups (example: epoxy group, hydroxyl group, and amino group), which can react with the functional group (example: acid group) in the polymer, as a cross-linking agent.

Examples of polyfunctional molecules include polyethylene glycol diglycidyl ether, glycerol diglycidyl ether, ethylene glycol, polyethylene glycol, propylene glycol, glycerin, pentaerythritol, ethylenediamine, polyethyleneimine, and ethylene carbonate.

Examples of polymers obtained by polymerizing the polymerizable monomers include polymers obtained by polymerizing the polymerizable monomers described in the above-described <<Method (1)>> as examples, specifically, polyacrylic acid, polymethacrylic acid, polyvinyl sulfonic acid, polystyrene sulfonic acid, and salts thereof (example: alkali metal salts, e.g., Na salts and K salts, and ammonium salts).

Examples of water-soluble or hydrophilic high molecular weight compounds include polysaccharides, e.g., methyl cellulose, dextran; polyethylene oxide, polypropylene oxide, polyvinyl alcohol, polyN-vinylpyrrolidone, polyN-vinylacetamide, polyvinylpyridine, polyacrylamide, polymethacrylamide, poly-N-acryloylpiperidine, poly-N-n-propyl methacrylamide, poly-N-isopropylacrylamide, poly-N,N-diethylacrylamide, poly-N-isopropyl methacrylamide, poly-N-cyclopropylacrylamide, poly-N-acryloylpyrrolidine, poly-N,N-ethylmethylacrylamide, poly-N-cyclopropyl methacrylamide, poly-N-ethylacrylamide, poly-N-methylacrylamide, polyhydroxymethyl acrylate; polyN,N-dimethylaminoethyl methacrylate, polyN,N-diethylaminoethyl methacrylate, polyN,N-dimethylaminopropylacrylamide, and salts thereof.

<<Polymerization Method>>

The polymerization method is not specifically limited and previously known methods are mentioned. Examples include a solution polymerization method in which the polymerizable monomer, the copolymerizable cross-linking agent, and a polymerization initiator are dissolved into water or an aqueous liquid (example: water, methanol, ethanol, acetone, N,N-dimethylformamide, dimethyl sulfoxide, methyl ethyl ketone, and mixtures of at least two types thereof) and the monomer and the like are polymerized with heat, light, electron beams, or the like; and a bulk polymerization method in which in the case where the polymerizable monomer is a liquid, the copolymerizable cross-linking agent and a polymerization initiator are added to the polymerizable monomer, and the monomer and the like are bulk-polymerized with heat, light, electron beams, or the like. In addition, an emulsion polymerization method, a suspension polymerization method, a precipitation polymerization method, and the like can be used. The thus obtained polymer is dried appropriately and, thereby, High molecular weight compound (A) can be obtained.

As for High molecular weight compound (A), commercially available products can also be used. Examples of the above-described commercially available products include Sky Gel (produced by Mebiol Inc.), SANFRESH (produced by Sanyo Chemical Industries, Ltd.), ACRYHOPE (produced by NIPPON SHOKUBAI CO., LTD.), and Fujimihuresshu (in Japanese) (produced by Fujimiryokka Co., Ltd.).

<<Adjustment of Saturated Water Absorption>>

The saturated water absorption of High molecular weight compound (A) can be adjusted by, for example, changing the type or the cross-linking density of High molecular weight compound (A). The saturated water absorption of High molecular weight compound (A) tends to depend on the cross-linked structure, especially the cross-linking density and, in general, the saturated water absorption tends to increase as the cross-linking density becomes low.

An adjustment to a predetermined cross-linking density can be performed by, for example, changing the usage of the copolymerizable cross-linking agent in the method according to the item (1) and by, for example, changing irradiance level of light, electron beams, γ-rays, or the like in the method according to the item (2).

<<Forming Agent for Foaming Agent>>

As described above, High molecular weight compound (A) is a forming agent for Foaming agent A. That is, the forming agent for the foaming agent A includes High molecular weight compound (A). The forming agent for the foaming agent A may include additives, as necessary. Examples of additives include an antioxidant and an antiseptic.

<Water (B)>

It is believed that in Foaming agent A, High molecular weight compound (A) is made into hydrogel by Water (B). Foaming agent A usually takes on the form of gel. Water (B) is not specifically limited insofar as Water (B) is included as a liquid (liquid dispersion), which contains water as a primary component, in Foaming agent A. Examples of liquid dispersion include water in itself (example: pure water, e.g., distilled water and ion-exchanged water, and service water), aqueous solutions, and water-containing liquids (example: mixed liquids of water and monohydric or polyhydric alcohol and the like). As for Foaming agent A, Water (B) uniformly dispersed in a subject is evaporated by heating and, thereby, the subject is foamed.

[Method for Manufacturing Foaming Agent A]

Foaming agent A can be produced by, for example, mixing High molecular weight compound (A) and Water (B) at room temperature (25° C.) and standing for about 1 hour while stirring is performed sometimes. The usage of them is selected appropriately in such a way that predetermined properties are obtained. In production of Foaming agent A, the amount of blend of Water (B) is usually 200 to 70,000 parts by mass, preferably 300 to 50,000 parts by mass, more preferably 400 to 50,000 parts by mass, further preferably 900 to 50,000 parts by mass, and particularly preferably 10,000 to 50,000 parts by mass relative to 100 parts by mass of High molecular weight compound (A). If the amount of blend of Water (B) increases, the storage modulus (G') usually decreases. If the amount of blend of Water (B) decreases, the storage modulus (G') usually increases.

In production of Foaming agent A, besides High molecular weight compound (A) and Water (B), additives may be blended, as necessary. Examples of additives include an antioxidant and an antiseptic.

[Use of Foaming Agent A (Subject of Foaming)]

As described above, Foaming agent A is especially favorably used as a foaming agent for foaming rubber. Examples of raw material rubber include natural rubber and synthetic rubber. Examples of synthetic rubber include ethylene.propylene.diene copolymer rubber (EPDM), nitrile rubber (NBR), butadiene rubber (BR), styrene.butadiene rubber (SBR), chloroprene rubber (CR), butyl rubber (IIR), chlorinated butyl rubber (CIIR), brominated butyl rubber (BIIR), isoprene rubber (IR), and acrylic rubber (ACM). Among them, from the viewpoints of foamability and properties of foamed material, Foaming agent A is favorably used as a foaming agent for natural rubber, EPDM, BR, SBR, CR, and IIR.

In addition, Foaming agent A can also be used as a foaming agent for foaming materials other than rubber. Examples of subjects of foaming include plastics, such as, vinyl chloride resin, vinyl chloride copolymer resin; polyolefin copolymer resin, e.g., polyethylene, polypropylene, ethylene-vinyl acetate copolymer resin; ABS resin, and polycarbonate resin.

In this regard, specific uses of Foaming agent A are referred to an item [Foamed material] described later.

The operating temperature (foaming temperature) of Foaming agent A is not specifically limited insofar as the temperature is higher than or equal to the evaporation temperature of water. For example, 100° C. to 300° C. is preferable at normal pressure from the viewpoint of proportion to the cross-linking reaction.

[Rubber Composition]

The rubber composition according to the present invention includes (1) at least one type of rubber component selected from natural rubber and synthetic rubber, (A) a high molecular weight compound having a saturated water absorption of 10 to 1,000 g/g in ion-exchanged water (25° C.), and (B) water. Hereafter the rubber component may be referred to as "Rubber component (I)".

In the rubber composition, Water (B) is uniformly dispersed in Rubber component (I) because High molecular weight compound (A) is present. As described above, it is estimated that Water (B) forms hydrogel together with High molecular weight compound (A) and, thereby, the dispersibility of Water (B) in Rubber component (I) is improved. The rubber composition has excellent workability in a kneading machine, extrusion moldability, in-mold moldability, injection moldability, and the like.

The rubber composition according to the present invention is obtained by, for example, mixing Rubber component (I) and Foaming agent A (hereafter may be referred to as "Foaming agent (II)") described above. That is, preferably, High molecular weight compound (A) and Water (B) are components derived from Foaming agent (II). That is, preferably, the rubber composition according to the present invention includes Rubber component (I) and Foaming agent (II).

A rubber composition according to a first embodiment of the present invention includes at least an ethylene.α-olefin.nonconjugated polyene random copolymer (I-1) as Rubber component (I), wherein 50 percent by mass or more of the copolymer (I-1) is a copolymer (X) described later.

A rubber composition according to a second embodiment of the present invention includes at least an ethylene.α-olefin.nonconjugated polyene random copolymer (I-1) as Rubber component (I), wherein 50 percent by mass or more of the copolymer (I-1) is a copolymer (Y) described later.

A rubber composition according to a third embodiment of the present invention includes at least an ethylene.α-olefin.nonconjugated polyene random copolymer (I-1) as Rubber component (I), wherein 10 to 50 percent by mass of the copolymer (I-1) is a copolymer (X) and 90 to 50 percent by mass is a copolymer (Y).

The rubber composition according to the first embodiment of the present invention has excellent workability in a kneading machine and extrusion foam moldability. The rubber composition according to the second embodiment of the present invention has excellent workability in a kneading machine and in-mold foam moldability. The rubber composition according to the third embodiment of the present invention has excellent workability in a kneading machine and moldability.

Meanwhile, in the case of, for example, extrusion foam molding, molding is performed under the pressureless condition and, therefore, even a small amount of evaporation of water causes outgassing from a surface layer of a molded material, so as to degrade the appearance. In order to suppress outgassing to stabilize generated foam cells, formation of an appropriate network structure is effective. Consequently, it is important to control the primary structure (in particular branch structure) and the cross-linking reactivity of the copolymer constituting the network structure in such a way that a good balance is ensured between the cross-linking rate and the evaporation rate of water.

In the rubber composition according to the first embodiment of the present invention, the ethylene.α-olefin.nonconjugated polyene random copolymer (I-1), especially the specific ethylene.α-olefin.nonconjugated polyene random copolymer (X) is used as the rubber component. Therefore, it is believed that the balance is excellent in extrusion foam molding and, thereby, a cross-linked foam having excellent appearance and lightweightness can be obtained.

Meanwhile, in the case of, for example, in-mold foam molding, evaporation (foaming) of water occurs rapidly on the surface in contact with the mold and a portion nearby the mold, so as to induce outgassing. As a result, there is a tendency of the specific gravity of a molded material not to decrease sufficiently. In order to suppress outgassing in the vicinity of the mold to stabilize generated foam cells, formation of an appropriate network structure is effective. Consequently, it is important to control the primary structure (in particular branch structure) and the cross-linking reactivity of the copolymer constituting the network structure in such a way that a good balance is ensured between the cross-linking rate and the evaporation rate of water.

In the rubber composition according to the second embodiment of the present invention, the ethylene.α-olefin.nonconjugated polyene random copolymer (I-1), especially the specific ethylene.α-olefin.nonconjugated polyene random copolymer (Y) is used as the rubber component. Therefore, it is believed that the balance is excellent in foam molding and, thereby, a cross-linked foam having excellent lightweightness can be obtained.

Meanwhile, in the case of, for example, molding, the fluidity of the rubber composition is important and, in addition, outgassing from a surface layer of a molded material is caused by even a small amount of evaporation of water at a molded material end portion which is a portion relatively not applied with a pressure easily during molding. As a result, degradation of the appearance is induced and, in addition, there is a tendency of the specific gravity not to decrease sufficiently. In order to suppress outgassing to stabilize generated foam cells, formation of an appropriate network structure is effective. Consequently, it is important to control the primary structure (in particular branch structure) and the cross-linking reactivity of the copolymer constituting the network structure in such a way that a good balance is ensured between the cross-linking rate and the evaporation rate of water.

In the rubber composition according to the third embodiment of the present invention, the ethylene.α-olefin.nonconjugated polyene random copolymer (I-1), especially the specific ethylene.α-olefin.nonconjugated polyene random copolymer (X) and copolymer (Y) are used in combination as the rubber component. Therefore, it is believed that the fluidity and the balance is excellent in molding and, thereby, a cross-linked foam having excellent appearance of the end portion surface and lightweightness can be obtained.

<Rubber Component (I)>

Examples of Rubber component (I) include raw material rubber, e.g., natural rubber and synthetic rubber, that is, at least one type of rubber selected from the natural rubber and the synthetic rubber.

Examples of synthetic rubber include ethylene.α-olefin.nonconjugated polyene random copolymers (I-1), e.g., ethylene.propylene.diene copolymer rubber (EPDM), nitrile rubber (NBR), butadiene rubber (BR), styrene.butadiene rubber (SBR), chloroprene rubber (CR), butyl rubber (IIR), chlorinated butyl rubber (CIIR), brominated butyl rubber (BIIR), isoprene rubber (IR), and acrylic rubber (ACM).

Among them, natural rubber, ethylene.α-olefin.nonconjugated polyene random copolymer (I-1), e.g., EPDM, BR, SBR, CR, and IIR are preferable from the viewpoints of foamability and properties of foamed material.

The rubber composition according to the present invention includes Rubber component (I), preferably includes the ethylene.α-olefin.nonconjugated polyene random copolymer (I-1), and particularly preferably rubber compositions according to the first to third embodiments including the following specific copolymer.

The rubber composition according to the first embodiment of the present invention includes the ethylene.α-olefin.nonconjugated polyene random copolymer (I-1), and 50 percent by mass or more, preferably 60 percent by mass or more, and particularly preferably 70 percent by mass or more of the copolymer (I-1) is a specific ethylene.α-olefin.nonconjugated polyene random copolymer (X) described below. Use of the copolymer (X) within the range exerts an effect in obtaining an extrusion cross-linked foam exhibiting excellent compression set property and lightweightness and having small surface roughness and good molded material appearance.

The rubber composition according to the second embodiment of the present invention includes the ethylene.α-olefin.nonconjugated polyene random copolymer (I-1), and 50 percent by mass or more, preferably 60 percent by mass or more, and particularly preferably 70 percent by mass or more of the copolymer (I-1) is a specific ethylene.α-olefin.nonconjugated polyene random copolymer (Y) described below. Use of the copolymer (Y) within the range exerts an effect in obtaining a cross-linked foam exhibiting excellent lightweightness.

The rubber composition according to the third embodiment of the present invention includes the ethylene.α-olefin.nonconjugated polyene random copolymer (I-1), and 10 to 50 percent by mass of the copolymer (I-1) is a specific ethylene.α-olefin.nonconjugated polyene random copolymer (X) described below and 90 to 50 percent by mass is a specific ethylene.α-olefin.nonconjugated polyene random copolymer (Y) described below. Preferably, 10 to 40 percent by mass of the copolymer (I-1) is the copolymer (X), and 90 to 60 percent by mass is the copolymer (Y). Here, the total of the copolymer (X) and the copolymer (Y) is preferably 100 percent by mass.

Use of the copolymer (X) and the copolymer (Y) within the range in combination can ensure the kneading workability (handleability) and the fluidity of the rubber composition suitable for molding and the mechanical strength of the resulting cross-linked foam, and the use exerts an effect in obtaining a cross-linked foam, which has small compression set and surface roughness of the end portion surface and which exhibits excellent lightweightness.

Copolymers (X) and (Y)

The copolymer (X) is a copolymer containing structural units [A] derived from ethylene, structural units [B] derived from an α-olefin having the carbon number of 3 to 20, structural units [C-1] derived from a nonconjugated polyene, in which among carbon.carbon double bonds, only one carbon.carbon double bond polymerizable with a metallocene catalyst is present in one molecule, and structural units [C-2] derived from a nonconjugated polyene, in which among the carbon.carbon double bonds, two carbon.carbon double bonds polymerizable with a metallocene catalyst are present in one molecule, and satisfying the following requirements (1) to (3).

(1) The content of the structural units [B] derived from an α-olefin having the carbon number of 3 to 20 is 10 to 50 percent by mole in 100 percent by mole of the total structural units of the copolymer (X).

(2) The total content of the structural units [C-1] derived from a nonconjugated polyene, in which among carbon.carbon double bonds, only one carbon.carbon double bond polymerizable with a metallocene catalyst is present in one molecule, and the structural units [C-2] derived from a nonconjugated polyene, in which among the carbon.carbon double bonds, two carbon.carbon double bonds polymerizable with a metallocene catalyst are present in one molecule, is 1.0 to 6.0 percent by mole in 100 percent by mole of the total structural units of the copolymer (X).

(3) The limiting viscosity [η] measured in a decalin solution at 135° C. is 2.0 to 4.0 dL/g.

The copolymer (Y) is a copolymer containing structural units [A'] derived from ethylene, structural units [B'] derived from an α-olefin having the carbon number of 3 to 20, structural units [C-1'] derived from a nonconjugated polyene, in which among carbon.carbon double bonds, only one carbon.carbon double bond polymerizable with a metallocene catalyst is present in one molecule, and structural units [C-2'] derived from a nonconjugated polyene, in which among the carbon.carbon double bonds, two carbon.carbon double bonds polymerizable with a metallocene catalyst are present in one molecule, and satisfying the following requirements (4) to (6).

(4) The content of the structural units [B'] derived from an α-olefin having the carbon number of 3 to 20 is 10 to 50 percent by mole in 100 percent by mole of the total structural units of the copolymer (Y).

(5) The total content of the structural units [C-1'] derived from a nonconjugated polyene, in which among carbon.carbon double bonds, only one carbon.carbon double bond polymerizable with a metallocene catalyst is present in one molecule, and the structural units [C-2'] derived from a nonconjugated polyene, in which among the carbon.carbon double bonds, two carbon.carbon double bonds polymerizable with a metallocene catalyst are present in one molecule, is 1.0 to 6.0 percent by mole in 100 percent by mole of the total structural units of the copolymer (Y).

(6) The limiting viscosity [η] measured in a decalin solution at 135° C. is 0.8 to 1.8 dL/g.

In the present specification, ethylene may be referred to as Component [A], the α-olefin having the carbon number of 3 to 20 may be referred to as Component [B], the nonconjugated polyene, in which among carbon.carbon double bonds, only one carbon.carbon double bond polymerizable with a metallocene catalyst is present in one molecule, may be referred to as Component [C-1], and the nonconjugated polyene, in which among the carbon.carbon double bonds, two carbon.carbon double bonds polymerizable with the metallocene catalyst are present in one molecule, may be referred to as Component [C-2].

<Structural Units [A], [A'] Derived from Ethylene>

The copolymer (X) contains structural units [A] derived from ethylene.

The copolymer (Y) contains structural units [A'] derived from ethylene.

The content of the structural units [A] in the copolymer (X) and the content of the structural units [A'] in the copolymer (Y) are independently usually 44 to 88 percent by mole, and preferably 50 to 73 percent by mole in 100 percent by mole of the total structural units. It is preferable that the contents of the structural units [A] and [A'] be within the range because a cross-linked foam obtained from the rubber composition including the copolymer (X) and/or the copolymer (Y) has excellent flexibility and mechanical characteristics at low temperatures. The content can be determined on the basis of $^{13}$C-NMR.

<Structural Units [B], [B'] Derived from α-Olefin Having the Carbon Number of 3 to 20>

The copolymer (X) contains structural units [B] derived from an α-olefin having the carbon number of 3 to 20. The copolymer (Y) contains structural units [B'] derived from an α-olefin having the carbon number of 3 to 20.

The copolymer (X) and the copolymer (Y) independently contain structural units derived from at least one type of α-olefin having the carbon number of 3 to 20, and may contain structural units derived from at least two types of α-olefins having the carbon number of 3 to 20.

The content of the structural units [B] in the copolymer (X) and the content of the structural units [B'] in the copolymer (Y) are independently 10 to 50 percent by mole, and preferably 25 to 45 percent by mole in 100 percent by mole of the total structural units. It is preferable that the contents of the structural units [B] and [B'] be within the range because a cross-linked foam obtained from the rubber composition including the copolymer (X) and/or the copolymer (Y) has excellent flexibility and mechanical characteristics at low temperatures. The content can be determined on the basis of $^{13}$C-NMR.

Examples of α-olefins having the carbon number of 3 to 20 include propylene, 1-butene, 1-pentene, 1-hexene, 4-methyl-1-pentene, 1-heptene, 1-octene, 1-decene, 1-dodecene, 1-tetradecene, 1-hexadecene, and 1-eicosene. Among them, α-olefins having the carbon number of 3 to 8, e.g., propylene, 1-butene, 1-hexene, and 1-octene, are preferable and propylene is particularly preferable because the raw material costs are relatively low and the resulting copolymer (X) and copolymer (Y) exhibit excellent mechanical properties.

<Structural Units [C-1] and [C-2], Structural Units [C-1'] and [C-2']>

The copolymer (X) contains structural units [C-1] and structural units [C-2].

The copolymer (Y) contains structural units [C-1'] and structural units [C-2'].

The copolymer (X) and the copolymer (Y) independently contain structural units derived from at least one type of Component [C-1], may contain structural units derived from at least two types of Components [C-1], contain structural units derived from at least one type of Component [C-2], and may contain structural units derived from at least two types of Component [C-2].

In this regard, the structural units [C-1] and [C-1'] refer to a structural unit in which, in Component [C-1] concerned, a carbon.carbon double bond polymerizable with a metallocene catalyst is reacted and which is bonded to the same type or another type of structural unit in that portion.

Meanwhile, the structural units [C-2] and [C-2'] include both a structural unit in which, in Component [C-2] concerned, one carbon.carbon double bond polymerizable with a metallocene catalyst is reacted and which is bonded to the same type or another type of structural unit in that portion and the other carbon.carbon double bond polymerizable with a metallocene catalyst is not reacted and remains (the formula (1) described below), and a structural unit in which one carbon.carbon double bond polymerizable with a metallocene catalyst is reacted and which is bonded to the same type or another type of structural unit in that portion and the other carbon.carbon double bond polymerizable with a metallocene catalyst is reacted to form a branch structure (the formula (2) described below). The following formulae (1) and (2) show the case of 5-vinyl-2-norbornene.

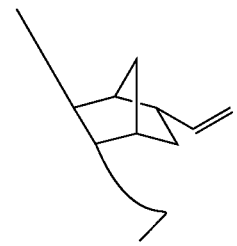

(1)

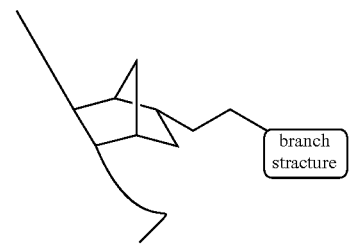

(2)

<<Component [C-1]>>

Examples of Component [C-1] (nonconjugated polyene, in which among carbon.carbon double bonds, only one carbon.carbon double bond polymerizable with a metallocene catalyst is present in one molecule, preferably nonconjugated diene) include aliphatic polyenes and alicyclic polyenes.

Examples of the aliphatic polyenes do not include chain polyenes, in which both terminals are vinyl groups ($CH_2=CH-$), but include compounds, in which one of the carbon-carbon double bonds is present as a vinyl group at a molecular terminal and the other carbon-carbon double bond(s) is/are present as internal olefin bond(s) in a molecular chain (main chain or side chain). The internal olefin bond is not polymerized with a metallocene catalyst or the polymerizability is poorer than that of the vinyl group.

Specific examples of the aliphatic polyenes include 1,4-hexadiene, 1,5-heptadiene, 1,6-octadiene, 1,7-nonadiene, 1,8-decadiene, 1,12-tetradecadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, and 4,8-dimethyl-1,4,8-decatriene. Among them, 7-methyl-1,6-octadiene is preferable.

One type of aliphatic polyene can be used alone or at least two types can be used in combination.

Examples of alicyclic polyenes include compounds composed of an alicyclic portion having one carbon.carbon double bond polymerizable with a metallocene catalyst and a chain portion having an internal olefin bond (carbon.carbon double bond), e.g., an alkylidene group, which is not polymerized with a metallocene catalyst or the polymerizability of which is poor. Specific examples include 5-ethylidene-2-norbornene (ENB), 5-propylidene-2-norbornene, and 5-butylidene-2-norbornene. Among them, 5-ethylidene-2-norbornene (ENB) is preferable. Examples of other alicyclic polyenes include 2-methyl-2,5-norbornadiene and 2-ethyl-2,5-norbornadiene.

One type of alicyclic polyene can be used alone or at least two types can be used in combination.

<<Component [C-2]>>

Examples of Component [C-2] (nonconjugated polyene, in which among carbon.carbon double bonds, two carbon.carbon double bonds polymerizable with a metallocene catalyst are present in one molecule, preferably nonconjugated diene) include 5-alkenyl-2-norbornene, e.g., 5-vinyl-2-norbornene (VNB) and 5-allyl-2-norbornene; alicyclic polyenes, e.g., 2,5-norbornadiene, dicyclopentadiene (DCPD), and tetracyclo[4,4,0,1$^{2.5}$,1$^{7.10}$]deca-3,8-diene; and α,ω-dienes, e.g., 1,7-octadiene and 1,9-decadiene. Among them, 5-vinyl-2-norbornene (VNB), dicyclopentadiene (DCPD), 2,5-norbornadiene, 1,7-octadiene, and 1,9-decadiene are preferable, and 5-vinyl-2-norbornene (VNB) is particularly preferable.

One type of them can be used alone or at least two types can be used in combination.

<<Contents of Structural Units [C-1] and [C-2] and Contents of Structural Units [C-1'] and [C-2']>>

The total content of the structural units [C-1] and the structural units [C-2] in the copolymer (X) and the total content of the structural units [C-1'] and the structural units [C-2'] in the copolymer (Y) are independently 1.0 to 6.0 percent by mole, and preferably 1.0 to 5.0 percent by mole in 100 percent by mole of the total structural units. It is preferable that the total contents of these structural units be within the range because the network structure can be controlled relatively easily and, thereby, a good balance can be ensured between the cross-linking rate and the evaporation rate of water. The total content can be determined on the basis of $^{13}$C-NMR.

It is preferable that the copolymer (X) and/or the copolymer (Y) contain structural units derived from 5-ethylidene-2-norbornene (ENB). In 100 percent by mole of the total structural units of the copolymer (X) or in 100 percent by mole of the total structural units of the copolymer (Y), the contents of the structural units derived from 5-ethylidene-2-norbornene (ENB) are independently preferably 1 to 5 percent by mole, and more preferably 1 to 4 percent by mole. It is preferable that the content of the structural units be within the range because the cross-linking reactivity can be controlled relatively easily and, in addition, a cross-linked foam obtained from the rubber composition including the copolymer (X) and/or the copolymer (Y) has excellent rubber elasticity. The content can be determined on the basis of $^{13}$C-NMR.

It is preferable that the copolymer (X) and/or the copolymer (Y) contain structural units derived from 5-vinyl-2-norbornene (VNB). In 100 percent by mass of the total structural units of the copolymer (X) or in 100 percent by mass of the total structural units of the copolymer (Y), the contents of the structural units derived from 5-vinyl-2-norbornene (VNB) are independently preferably 0.01 to 0.45 percent by mole, and more preferably 0.05 to 0.40 percent by mole. It is preferable that the content of the structural units be within the range because appropriate branch structures can be introduced into the copolymer (X) and the copolymer (Y), outgassing can be suppressed and, thereby, the surface smoothness of the resulting cross-linked foam becomes good, or the specific gravity of the resulting cross-linked foam is reduced. The above-described content can be determined on the basis of $^{13}$C-NMR.

<Properties of Copolymer (X) and Copolymer (Y)>

The limiting viscosity [η] of the copolymer (X) measured in a decalin solution at 135° C. is 2.0 to 4.0 dL/g, preferably 2.3 to 4.0 dL/g, and more preferably 2.5 to 4.0 dL/g. The copolymer (X) is a component contributing to improvements in the kneading workability (handleability) and the mechanical strength of the cross-linked foam. It is preferable that the [η] be within the range because extrusion molding and foam molding can be performed favorably, and in the case where the resulting cross-linked foam is used as a weather strip sponge, a good sealing property is obtained.

The limiting viscosity [η] of the copolymer (Y) measured in a decalin solution at 135° C. is 0.8 to 1.8 dL/g, preferably 1.0 to 1.8 dL/g, and more preferably 1.0 to 1.6 dL/g. The copolymer (Y) is a component contributing to an improvement in the fluidity of the rubber composition. It is preferable that the [η] be within the range because the rubber composition exhibits excellent fluidity, in-mold foam molding can be performed favorably, and in the case where the resulting cross-linked foam is used as an automobile cushioning material and heat insulating material, good dynamic characteristics are obtained. In addition, it is preferable that the [η] be within the range because molding can be performed favorably, and a rubber molded article having a shape complicated along with enhancement of performance and functionality of the individual parts can be obtained.

<Specific Examples of Copolymer (X) and Copolymer (Y)>

Preferable examples of the copolymers (X) and the copolymers (Y) include ethylene.α-olefin.5-ethylidene-2-norbornene (ENB).5-vinyl-2-norbornene (VNB) quatercopolymer, ethylene.α-olefin.5-butylidene-2-norbornene.5- vinyl-2-norbornene (VNB) quatercopolymer, and ethylene.α-olefin.4,8-dimethyl-1,4,8-decatriene.5-vinyl-2-norbornene (VNB) quatercopolymer. Ethylene.α-olefin.5-ethylidene-2-norbornene (ENB) .5-vinyl-2-norbornene (VNB) quatercopolymer is particularly preferable.

A copolymer produced from ethylene, propylene, 5-ethylidene-2-norbornene (ENB), and 5-vinyl-2-norbornene (VNB) will be taken as an example of the copolymer (X) and the copolymer (Y), and a method for measuring the contents of the individual structural units will be described.

The structure (composition) analysis of the above-described copolymer through the use of $^{13}$C-NMR can be performed on the basis of "Macromolecules, 1977, Vol. 10, p. 536-544" by C. J. Carman, R. A. Harrington, and C. E. Wilkes, "Macromolecules, 1982, Vol. 15, p. 1150-1152" by Masahiro Kakugo, Yukio Naito, Kooji Mizunuma, and Tatsuya Miyatake, and "Macromolecules, 1983, Vol. 16, p. 85-89" by G. Van der Velden. The structure analysis of the VNB copolymer can be performed on the basis of "Macromol. Rapid Commun., 1999, Vol. 20, p. 356-360" by Harri Lasarov and Tuula T. Pakkanen and "Macromol. Rapid Commun., 2001, Vol. 22, p. 434-438" by Harri Lasarov and Tuula T. Pakkanen.

Initially, the integral values of the individual peaks derived from ethylene, propylene, ENB, and VNB in the copolymer (X) and the copolymer (Y) are determined through the use of $^{13}$C-NMR on the basis of the following items 1) to 4).

1) ethylene: [integral of peak derived from ethylene sequence]+[integral of peak derived from ethylene-propylene sequence]/2

2) propylene: [integral of peak derived from propylene sequence]+[integral of peak derived from ethylene-propylene sequence]/2

3) ENB: integral of peak of ENB-position 3

4) VNB: integral of peak of VNB-position 7

Chemical formulae of structural units (E-isomer, Z-isomer) derived from ENB and chemical formulae of structural units (endo (n), exo (x)) derived from VNB in the copolymer (X) and the copolymer (Y) are described below.

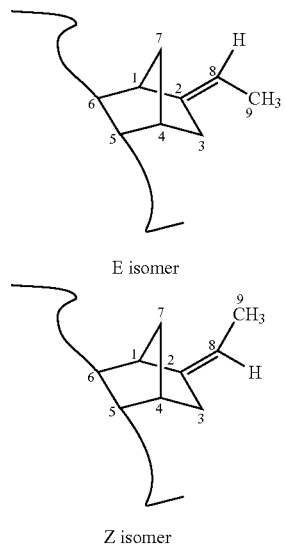

E isomer

Z isomer

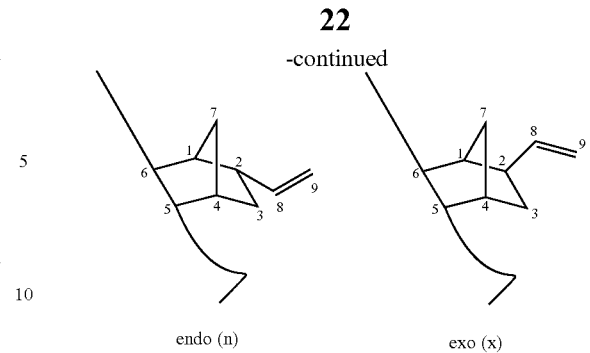

endo (n)                    exo (x)

The percent by mole of the structural units derived from ethylene, propylene, ENB, and VNB are calculated from the ratio of the resulting integrals. In this regard, conversion to percent by mole is performed on the assumption that the molecular weight of ethylene is 28.05, the molecular weight of propylene is 42.08, and the molecular weights of ENB and VNB are 120.2.

<Method for Manufacturing Copolymer (X) and Copolymer (Y)>

Component [A], Component [B], Component [C-1], and Component [C-2] described above are used as monomers, and the copolymer (X) and the copolymer (Y) are copolymers containing structural units derived from these raw materials.

The copolymer (X) and the copolymer (Y) are polymers different from each other mainly in the limiting viscosity [η]. These limiting viscosities [η] can be adjusted by, for example, the amount of supply of hydrogen in polymerization.

It is preferable that the copolymer (X) and the copolymer (Y) are copolymers produced by using a metallocene catalyst represented by Formula (I), Formula (II), or Formula (III) because the composition in the copolymer can be controlled relatively easily.

In this regard, in the following explanations of each formula, examples of hydrocarbyl having the carbon number of 1 to 20 include linear alkyls, e.g., methyl, ethyl, and butyl; and branched alkyls, e.g., t-butyl and neopentyl. Examples of hydrocarbyloxy having the carbon number of 1 to 20 include linear alkyloxy, e.g., methyloxy, ethyloxy, and butyloxy, and branched alkyloxy, e.g., t-butyloxy and neopentyloxy. Examples of halogenated alkyl having the carbon number of 1 to 20 include groups produced by chlorinating, brominating, or fluorinating the linear alkyl or branched alkyl. Examples of halogenated aryl include chlorophenyl and chloronaphthyl.

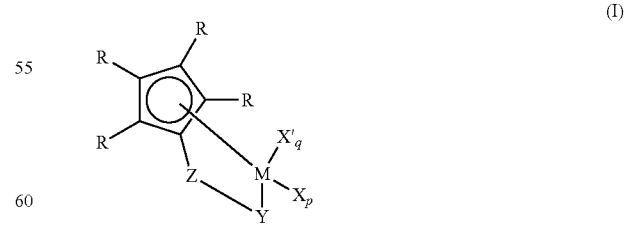

(I)

In Formula (I), each R represents independently a group selected from hydrocarbyl, halohydrocarbyl, silyl, germyl, and combinations thereof or a hydrogen atom, and the number of atoms excluding hydrogen, included in the group, is 20 or less.

The letter M represents titanium, zirconium, or hafnium.

The letter Y represents —O—, —S—, —NR*—, or —PR*—.

The letter R* represents a hydrogen atom, hydrocarbyl, hydrocarbyloxy, silyl, halogenated alkyl, or halogenated aryl, and in the case where R* is not hydrogen, R* includes 20 or less of atoms excluding hydrogen.

The letter Z represents a divalent group including boron or a group 14 element and, in addition, including nitrogen, phosphorus, sulfur or oxygen, and the number of atoms excluding hydrogen, included in the divalent group, is 60 or less.

The letter X represents, or in the case where a plurality of X is present, each X represents independently, an anionic ligand having the number of atoms of 60 or less (where a cyclic ligand, in which π electrons are delocalized, is excluded.). The letter X' represents, or in the case where a plurality of X' is present, each X' represents independently, a neutral linked compound having the number of atoms of 20 or less.

The letter p represents 0, 1, or 2.

The letter q represents 0 or 1.

In the case where p is 2 and q is 0, M is in an oxidized state of +4, X is an anionic ligand selected from the group consisting of halides, hydrocarbyl, hydrocarbyloxy, di(hydrocarbyl)amide, di(hydrocarbyl)phosphide, hydrocarbyl sulfide, silyl, halo-substituted derivatives thereof, di(hydrocarbyl)amino-substituted derivatives thereof, hydrocarbyloxy-substituted derivatives thereof, and di(hydrocarbyl)phosphino-substituted derivatives thereof, and the number of atoms excluding hydrogen of X is 20 or less.

In the case where p is 1 and q is 0, M is in an oxidized state of +3 and X is an anionic stabilizing ligand selected from the group consisting of allyl, 2-(N,N'-dimethylaminomethyl)phenyl, and 2-(N,N'-dimethyl)aminobenzyl; or M is in an oxidized state of +4, and X is a divalent conjugated diene derivative and forms a metallacyclopentene ring with M.

In the case where p is 0 and q is 1, M is in an oxidized state of +2, and X' is a neutral conjugated or nonconjugated diene, which may be substituted with at least one hydrocarbyl, which has the number of carbon atoms of 40 or less, and which forms a π complex with M.

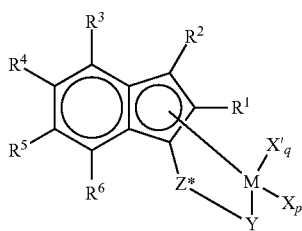

(II)

In Formula (II), $R^1$ and $R^2$ represent independently a hydrogen atom or an alkyl having the carbon number of 1 to 6, and at least one of $R^1$ and $R^2$ is not a hydrogen atom. The Letters $R^3$ to $R^6$ represent independently a hydrogen atom or an alkyl having the carbon number of 1 to 6. In this regard, $R^1$ to $R^6$ may be bonded to each other to form a ring.

The letter M represents titanium.

The letter Y represents —O—, —S—, —NR*—, or —PR*—.

The letter Z* represents —SiR*$_2$—, —CR*$_2$—, —SiR*$_2$SiR*$_2$—, —CR*$_2$CR*$_2$—, —CR*=CR*—, —CR*$_2$SiR*$_2$—, or —GeR*$_2$—.

Each letter R* represents independently a hydrogen atom, hydrocarbyl, hydrocarbyloxy, silyl, halogenated alkyl, or halogenated aryl, and in the case where R* is not hydrogen, R* includes 20 or less of atoms excluding hydrogen. Two R*s (in the case where R* is not hydrogen) included in Z* may be bonded to each other to form a ring, or R* in Z* and R* in Y may be bonded to each other to form a ring.

The letter p represents 0, 1, or 2.

The letter q represents 0 or 1.

In the case where p is 2; q is 0, M is in an oxidized state of +4, and each X represents independently methyl or benzyl. In the case where p is 1; q is 0, M is in an oxidized state of +3, and X is 2-(N,N'-dimethyl)aminobenzyl or M is in an oxidized state of +4, and X is 1,3-butadienyl. In the case where p is 0; q is 1, M is in an oxidized state of +2, and X is 1,4-diphenyl-1,3-butadiene, 2,4-hexadiene or 1,3-pentadiene.

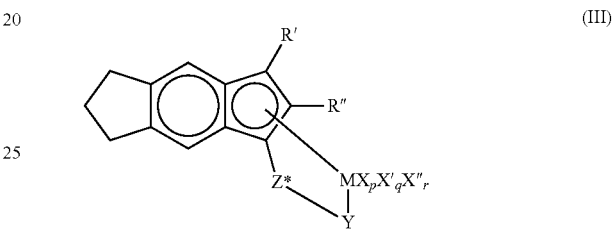

(III)

In Formula (III), R' represents a hydrogen atom, hydrocarbyl, di(hydrocarbyl)amino, or hydrocarbyleneamino, and R' other than a hydrogen atom has the carbon number of 1 to 20.

The letter R" represents a hydrogen atom or hydrocarbyl having the carbon number of 1 to 20.

The letter M represents titanium.

The letter Y represents —O—, —S—, —NR*—, —PR*—, —NR$_2$*, or —PR$_2$*.

The letter Z* represents —SiR*$_2$—, —CR*$_2$—, —SiR*$_2$SiR*$_2$—, —CR*$_2$CR*$_2$—, —CR*=CR*—, —CR*$_2$SiR*$_2$—, or —GeR*$_2$—.

Each R* represents independently a hydrogen atom, hydrocarbyl, hydrocarbyloxy, silyl, halogenated alkyl, or halogenated aryl, R* other than a hydrogen atom includes an atom of the atomic number of 2 to 20, and two R*s (in the case where R* is not a hydrogen atom) included in Z* may be bonded to each other to form a ring, or R* in Z* and R* in Y may be bonded to each other to form a ring.

The letter X represents a monovalent anionic ligand having the number of atoms of 60 or less excluding cyclic ligands, in which π electrons are delocalized. The letter X' represents a neutral linked group having the number of atoms of 20 or less. The letter X" represents a divalent anionic ligand having the number of atoms of 60 or less. The letter p represents 0, 1 or 2. The letter q represents 0 or 1. The letter r represents 0 or 1.

In the case where p is 2; q and r are 0, M is in an oxidized state of +4 (where the case, in which Y is —NR*$_2$ or —PR*$_2$, is excluded) or M is in an oxidized state of +3 (where Y is —NR*$_2$ or —PR*$_2$), and X is an anionic ligand selected from the group consisting of a halide group, a hydrocarbyl group, a hydrocarbyloxy group, a di(hydrocarbyl)amide group, a di(hydrocarbyl)phosphide group, a hydrocarbyl sulfide group and a silyl group, halogen-substituted groups of these groups, di(hydrocarbyl)amino-substituted groups of these groups, hydrocarbyloxy-substituted groups of these groups, and di(hydrocarbyl)phosphino-substituted groups of these groups while the groups include atoms of the atomic number of 2 to 30.

In the case where r is 1; p and q are 0, M is in an oxidized state of +4, X" is a dianionic ligand selected from the group consisting of a hydrocarbazyl group, an oxyhydrocarbyl group, and a hydrocarbylenedioxy group, and X" includes atoms of the atomic number of 2 to 30. In the case where p is 1; q and r are 0, M is in an oxidized state of +3, and X is an anionic stabilizing ligand selected from the group consisting of allyl group, 2-(N,N-dimethylamino)phenyl group, 2-(N,N-dimethylaminomethyl)phenyl group, and 2-(N,N-dimethylamino)benzyl group. In the case where p and r are 0; q is 1, M is in an oxidized state of +2, X' is a neutral conjugated diene or a neutral nonconjugated diene optionally substituted with at least one hydrocarbyl group, and X' has the number of carbon atoms of 40 or less and forms a bond with M through π-π interaction.

As for more preferable embodiments, in the case where p is 2 and q and r are 0 in Formula (III); M is in an oxidized state of +4, and each of X is independently methyl, benzyl, or halide. In the case where p and q are 0; r is 1, M is in an oxidized state of +4, and X" is 1,3-butadienyl, which forms a metallacyclopentene ring with M. In the case where p is 1; q and r are 0, M is in an oxidized state of +3, and X is 2-(N,N-dimethylamino)benzyl. In the case where p and r are 0; q is 1, M is in an oxidized state of +2, and X' is 1,4-diphenyl-1,3-butadiene or 1,3-pentadiene.

The compounds represented by the following Formula (III') among Formula (III) are particularly preferable.

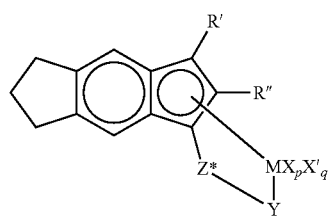

(III')

In Formula (III'), R' and R" represent independently a hydrogen atom or hydrocarbyl having the carbon number of 1 to 20, R' is preferably a hydrogen atom or methyl, and particularly preferably a hydrogen atom, and R" is preferably a hydrogen atom or methyl, and particularly preferably methyl. The letter M represents titanium, Y represents —NR*—, Z* represents —SiR*$_2$—, each R* represents independently a hydrogen atom or hydrocarbyl having the carbon number of 1 to 20, one of p and q is 0 and the other is 1. In the case where p is 0 and q is 1; M is in an oxidized state of +2 and X' is 1,4-diphenyl-1,3-butadiene or 1,3-pentadiene. In the case where p is 1 and q is 0; M is in an oxidized state of +3, and X is 2-(N,N-dimethylamino) benzyl.

Preferable examples of compounds represented by Formula (I), Formula (II), or Formula (III) include (t-butylamide)dimethyl($\eta^5$-2-methyl-s-indacen-1-yl)silane-titanium(II)2,4-hexadiene (compound represented by Formula (IV)), (t-butylamide)dimethyl($\eta^5$-2-methyl-s-indacen-1-yl)silane-titanium(IV)dimethyl (compound represented by Formula (V)), (t-butylamide)dimethyl($\eta^5$-2,3-dimethylindenyl)silane-titanium(II)1,4-diphenyl-1,3-butadiene (compound represented by Formula (VI)), (t-butylamide)dimethyl($\eta^5$-2,3-dimethyl-s-indacen-1-yl)silane-titanium(IV)dimethyl (compound represented by Formula (VII)), and (t-butylamide)dimethyl($\eta^5$-2-methyl-s-indacen-1-yl)silane-titanium(II)1,3-pentadiene (compound represented by Formula (VIII)). Among them, (t-butylamide)dimethyl($\eta^5$-2-methyl-s-indacen-1-yl)silane-titanium(II)1,3-pentadiene (compound represented by Formula (VIII)) is particularly preferable.

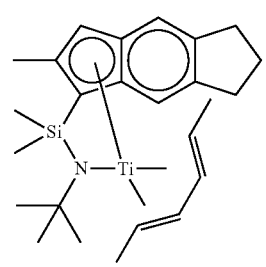

(IV)

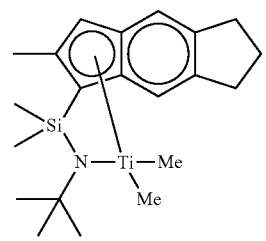

(V)

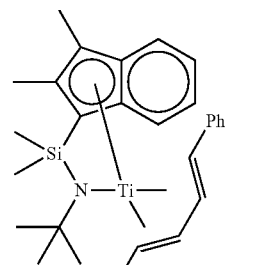

(VI)

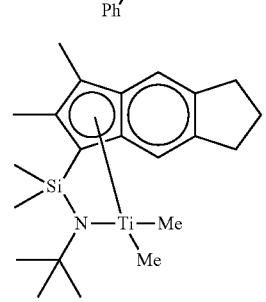

(VII)

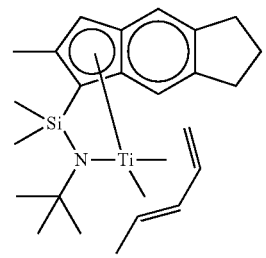

(VIII)

In the case where the compound represented by Formula (I), Formula (II), or Formula (III), preferably the compound represented by Formula (III'), and particularly preferably the compound represented by Formula (VIII) is used, regarding the polymerization reaction to produce the copolymer (X)

and the copolymer (Y), excellent copolymerizability of nonconjugated polyenes (Component [C-1] and Component [C-2]), in particular copolymerizability of the double bond at a terminal of the nonconjugated polyene [C-2], is exhibited. For example, the double bond at a VNB terminal is taken in efficiently and branches can be introduced at a high proportion. Furthermore, the molecular weight distributions and the composition distributions of the resulting copolymer (X) and copolymer (Y) are narrow and the copolymer having a very uniform molecular structure can be prepared. Therefore, formation of gel-like blobs, which is feared along with generation of branches, on a surface of a molded material is suppressed significantly. As a result, a cross-linked foam, produced including the copolymer (X) and/or copolymer (Y) does not contain the gel-like blob. Consequently, excellent appearance of the surface thereof is exhibited, and a shape-retaining property is excellent, so that good production stability is exhibited.

These catalysts can be prepared by using a known synthesis method, such as a method disclosed in International Publication No. 98/49212.

Preferably, the metallocene catalyst is used in production of the copolymer (X) and the copolymer (Y). For more details, the copolymer (X) and the copolymer (Y) can be produced by a continuous method or a batch method, wherein the metallocene catalyst is used as a main catalyst, a boron compound and/or an organoaluminum compound is used as a cocatalyst, an aliphatic hydrocarbon, e.g., hexane, is served as a solvent, and a reactor with an stirrer is used.

Examples of boron compounds include trityl tetrakis(pentafluorophenyl)borate, trimethylammonium tetrakis(pentafluorophenyl)borate, di(hydrogenated-tallowalkyl)methylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris(pentafluorophenyl)borate, N,N-diethylanilinium tetrakis(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, and N,N-dimethyl-2,4,6-trimethylanilinium tetrakis(2,3,4,6-tetrafluorophenyl)borate;

dialkylammonium salts, e.g., di(i-propyl)ammonium tetrakis(pentafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, and dicyclohexylammonium tetrakis(pentafluorophenyl)borate;

trisubstituted phosphonium salts, e.g., triphenylphosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate;

disubstituted oxonium salts, e.g., diphenyloxonium tetrakis(pentafluorophenyl)borate, di(o-tolyl)oxonium tetrakis(pentafluorophenyl)borate, and di(2,6-dimethylphenyl)oxonium tetrakis(pentafluorophenyl)borate; and disubstituted sulfonium salts, e.g., diphenylsulfonium tetrakis(pentafluorophenyl)borate, di(o-tolyl)sulfonium tetrakis(pentafluorophenyl)borate, and bis(2,6-dimethylphenyl)sulfonium tetrakis(pentafluorophenyl)borate.

As for the organic aluminum compound, trialkylaluminum compounds, e.g., triisobutylaluminum (hereafter may be referred to as "TIBA") is mentioned.

The reaction temperature can be raised to 100° C. because the catalyst is not deactivated even at high temperatures. The polymerization pressure is usually within the range of more than 0 MPa and 8 MPa or less (gauge pressure), and preferably more than 0 MPa and 5 MPa or less (gauge pressure).

The reaction time (an average residence time in the case where copolymerization is performed by a continuous method) is different depending on the condition, e.g., a catalyst concentration and a reaction temperature, and is usually 0.5 minute to 5 hours, and preferably 10 minutes to 3 hours. Furthermore, a molecular weight modifier, e.g., hydrogen, can also be used.

The molar (charge) ratio ([A]/[B]) of Component [A] to Component [B] is usually 25/75 to 80/20, and preferably 30/70 to 70/30.

The molar (charge) ratio ([A]/[C-1]) of Component [A] to Component [C-1] is usually 70/30 to 99/1, and preferably 80/20 to 98/2.

The molar (charge) ratio ([A]/[C-2]) of Component [A] to Component [C-2] is usually 70/30 to 99.9/0.1, and preferably 80/20 to 99.8/0.2.

It is preferable that the polymerization be performed by using the catalyst because the nonconjugated polyene and the like having a double bond is copolymerized at a high degree of conversion and an appropriate amount of long chain branches can be introduced in the resulting copolymer.

Copolymer (I-1) Other than Copolymer (X) and Copolymer (Y)

Examples of ethylene.α-olefin.nonconjugated polyene random copolymers (I-1) include, besides the copolymer (X) and the copolymer (Y), ethylene.α-olefin.nonconjugated polyene random copolymers other than them, specifically ethylene.α-olefin.nonconjugated polyene random terpolymers.

Examples of ethylene.α-olefin.nonconjugated polyene random terpolymers include copolymers containing structural units derived from ethylene, structural units derived from an α-olefin having the carbon number of 3 to 20, and structural units derived from a nonconjugated polyene.

In the terpolymer, the content of the structural units derived from ethylene is usually 50 to 89 percent by mole, and preferably 55 to 84 percent by mole in 100 percent by mole of the total structural units.

In the terpolymer, the content of the structural units derived from an α-olefin having the carbon number of 3 to 20 is usually 10 to 49 percent by mole, and preferably 15 to 44 percent by mole in 100 percent by mole of the total structural units.

In the terpolymer, the content of the structural units derived from a nonconjugated polyene is usually 1 to 5 percent by mole, and preferably 1 to 4 percent by mole in 100 percent by mole of the total structural units.

These contents can be determined on the basis of $^{13}$C-NMR.

As for the α-olefin having the carbon number of 3 to 20, the α-olefin having the carbon number of 3 to 20 (Component [B]) shown as examples in explanations of the copolymer (X) and the copolymer (Y) are mentioned. The same goes for preferable examples. As for the nonconjugated polyene, the nonconjugated polyene, in which among carbon.carbon double bonds, only one carbon.carbon double bond polymerizable with a metallocene catalyst is present in one molecule (Component [C-1]) shown as examples in explanations of the copolymer (X) and the copolymer (Y) are mentioned. The same goes for preferable examples.

In the rubber composition according to the first embodiment of the present invention, the limiting viscosity [η] of the ethylene.α-olefin.nonconjugated polyene random terpolymer measured in a decalin solution at 135° C. is usually 2.0 to 4.0 dL/g, preferably 2.3 to 4.0 dL/g, and more preferably 2.5 to 4.0 dL/g.

In the rubber composition according to the second embodiment of the present invention, the limiting viscosity [η] of the ethylene.α-olefin.nonconjugated polyene random terpolymer measured in a decalin solution at 135° C. is usually 0.8 to 1.8 dL/g, preferably 1.0 to 1.8 dL/g, and more preferably 1.0 to 1.6 dL/g.

Examples of ethylene.α-olefin.nonconjugated polyene random terpolymers include ethylene.α-olefin.5-ethylidene-2-norbornene (ENB) terpolymers, and ethylene.propylene.5-ethylidene-2-norbornene (ENB) terpolymers are particularly preferable.

The ethylene.α-olefin.nonconjugated polyene random terpolymer can be produced in conformity with the method for manufacturing the copolymer (X) and the copolymer (Y).

<High Molecular Weight Compound (A)>

The rubber composition according to the present invention includes High molecular weight compound (A).

In the rubber composition according to the present invention, the content of High molecular weight compound (A) is preferably 0.001 to 30 parts by mass, more preferably 0.002 to 20 parts by mass, and further preferably 0.002 to 10 parts by mass relative to 100 parts by mass of Rubber component (I), e.g., the copolymer (I-1). In the case where the content of High molecular weight compound (A) is within the range, the uniform dispersibility of Water (B) in the raw material rubber composition is excellent. If the content of High molecular weight compound (A) is more than the range, a problem may occur in that High molecular weight compound (A) is coagulated and becomes a foreign matter. If the content is less than the range, High molecular weight compound (A) cannot hold Water (B) sufficiently and a uniform rubber composition may not be obtained.

<Water (B)>

The rubber composition according to the present invention includes Water (B).

It is believed that in the rubber composition according to the present invention, High molecular weight compound (A) is made into hydrogel by Water (B). Water (B) is not specifically limited insofar as Water (B) is included as a liquid (liquid dispersion), which contains water as a primary component, in the rubber composition. Examples of liquid dispersion include water in itself (example: pure water, e.g., distilled water and ion-exchanged water, and service water), aqueous solutions, and water-containing liquids (example: mixed liquids of water and monohydric or polyhydric alcohol and the like). In the present invention, Water (B) uniformly dispersed in Rubber component (I), e.g., the copolymer (I-1), is evaporated by heating and, thereby, the rubber composition according to the present invention is foamed.

In the rubber composition according to the present invention, the content of Water (B) is preferably 0.5 to 300 parts by mass, more preferably 1 to 300 parts by mass, further preferably 1 to 100 parts by mass, and particularly preferably 1 to 50 parts by mass relative to 100 parts by mass of Rubber component (I). It is preferable that the content of Water (B) be within the range from the viewpoint of the amount of generation of foaming gas. If the content is more than the range, Water (B) is not uniformly dispersed in the raw material rubber composition and a problem may occur in that the workability is degraded significantly. If the content is less than the range, a problem may occur in that the specific gravity of the foamed material is not reduced sufficiently.

<Foaming Agent (II)>

Foaming agent (II) is Foaming agent A described above.

In the rubber composition according to the present invention, the content (amount of blend) of Foaming agent (II) is usually 0.5 to 300 parts by mass, preferably 1 to 300 parts by mass, more preferably 1 to 100 parts by mass, and particularly preferably 1 to 50 parts by mass relative to 100 parts by mass of Rubber component (I).

In the rubber compositions according to the first embodiment, the second embodiment, and the third embodiment of the present invention, the content (amount of blend) of Foaming agent (II) is usually 0.5 to 300 parts by mass, preferably 1 to 300 parts by mass, more preferably 1 to 100 parts by mass, and particularly preferably 1 to 50 parts by mass relative to 100 parts by mass of the copolymer (I-1).

It is preferable that the content of Foaming agent (II) be within the range from the viewpoint of the amount of generation of foaming gas.

Furthermore, in the rubber composition according to the first embodiment of the present invention, a specific ethylene.α-olefin.nonconjugated polyene random copolymer (X) is used as the rubber component, so that outgassing from a surface layer of a molded material can be suppressed and, thereby, a cross-linked foam having excellent appearance and lightweightness can be obtained.

Meanwhile, in the rubber composition according to the second embodiment of the present invention, a specific ethylene.α-olefin.nonconjugated polyene random copolymer (Y) is used as the rubber component, so that outgassing in the vicinity of a mold can be suppressed and, thereby, a cross-linked foam having excellent lightweightness can be obtained.

Meanwhile, in the rubber composition according to the third embodiment of the present invention, specific ethylene.α-olefin.nonconjugated polyene random copolymers (X) and (Y) are used in combination as the rubber component, so that outgassing from a surface layer of a molded material end portion and the like can be suppressed and, thereby, a cross-linked foam having excellent appearance and lightweightness can be obtained.

<Other Components>

The rubber composition according to the present invention may include other components besides the above-described components. Examples of other components include foaming agents other than Foaming agent (II) (hereafter may be referred to as "other foaming agents"), a foaming aid, a cross-linking agent, a vulcanizing accelerator, a cross-linking aid, a reinforcing agent, an inorganic filler, a softener, an antioxidant (stabilizer), a processing aid, an activator, and a moisture absorbent.

<<Other Foaming Agents>>

Examples of other foaming agents include inorganic foaming agents, e.g., sodium bicarbonate and sodium carbonate; and organic foaming agents, for example, nitroso compounds, e.g., N,N'-dinitrosopentamethylenetetramine and N,N'-dinitrosoterephthalamide; azo compounds, e.g., azodicarbonamide and azobisisobutyronitrile; hydrazide compounds, e.g., benzenesulfonyl hydrazide and 4,4'-oxybis (benzenesulfonyl hydrazide); and azide compounds, e.g., calcium azide and 4,4'-diphenyldisulfonyl azide.

Examples of commercially available other foaming agents include VINIFOR AC#LQ (trade name; produced by EIWA CHEMICAL IND. CO., LTD., azodicarbonamide (abbreviation ADCA)), NEOCELLBORN N#1000SW (trade name; produced by EIWA CHEMICAL IND. CO., LTD., 4,4'-oxybis(benzenesulfonyl hydrazide) (abbreviation OBSH)), and CELLULAR D (trade name; produced by EIWA CHEMICAL IND. CO., LTD., N,N'-dinitrosopentamethylenetetramine (abbreviation DPT)).

Preferably, other foaming agents are not blended in consideration of the purpose and the like of the present invention. However, it is possible to blend within the bounds of not impairing the purpose of the present invention. Specifically, the amount of blend of the other foaming agents is preferably 15 parts by mass or less, and more preferably 10 parts by mass or less relative to 100 parts by mass of Rubber component (I), e.g., the copolymer (I-1). It is particularly preferable that the other foaming agents be not blended to the rubber composition.

<<Foaming Aid>>

The foaming aid may be added to the rubber composition according to the present invention in addition to the other foaming agents, as necessary. The foaming aid has a function of lowering the decomposition temperature of the other foaming agents, accelerating decomposition, uniforming bubbles, or the like. Examples of foaming aids include organic acids, e.g., salicylic acid, phthalic acid, stearic acid, oxalic acid, and citric acid, salts of the organic acids, urea, and urea derivatives. Examples of commercially available foaming aids include CELLPASTE K5 (trade name; produced by EIWA CHEMICAL IND. CO., LTD., urea) and FE-507 (trade name; produced by EIWA CHEMICAL IND. CO., LTD., sodium bicarbonate). The amount of blend of the foaming aid is preferably 7 parts by mass or less, and more preferably 5 parts by mass or less relative to 100 parts by mass of Rubber component (I), e.g., the copolymer (I-1).

<<Cross-Linking Agent>>

The rubber composition according to the present invention can be used without being cross-linked. However, use as a cross-linked foam after cross-linking is usually preferable. As for the cross-linking agents, sulfur compounds, organic peroxides, phenol resins, and oxime compounds are mentioned.

Examples of sulfur compounds include sulfur, sulfur chloride, sulfur dichloride, morpholine disulfide, alkylphenol disulfide, tetramethylthiuram disulfide, and selenium dithiocarbamate. Sulfur and tetramethylthiuram disulfide are preferable.

The amount of blend of the sulfur compound is preferably 0.1 to 5 parts by mass, more preferably 0.3 to 5 parts by mass, and further preferably 0.3 to 3 parts by mass relative to 100 parts by mass of Rubber component (I), e.g., the copolymer (I-1). It is preferable that the amount of blend of the sulfur compound be within the range because the rubber composition exhibits excellent cross-linking characteristics and there is no bloom on the surface of the resulting cross-linked foam.

Examples of organic peroxides include dicumyl peroxide, 2,5-dimethyl-2,5-di(t-butylperoxy)hexane, 2,5-dimethyl-2,5-di(benzolyperoxy)hexane, 2,5-dimethyl-2,5-di(t-butylperoxy)hexyne-3, di-t-butyl peroxide, di-t-butylperoxy-3,3,5-trimethylcyclohexane, and t-dibutyl hydroperoxide. Dicumyl peroxide, di-t-butyl peroxide, and di-t-butylperoxy-3,3,5-trimethylcyclohexane are preferable.

The amount of blend of the organic peroxide is preferably 1/500 to 1/20 mol, more preferably 1/300 to 1/50 mol, and further preferably 1/200 to 1/50 mol relative to 100 g of Rubber component (I), e.g., the copolymer (I-1). It is preferable that the amount of blend of the organic peroxide be within the range because the rubber composition exhibits excellent cross-linking characteristics and there is no bloom on the surface of the resulting cross-linked foam.

<<Vulcanizing Accelerator>>

In the case where the sulfur compound is used as the cross-linking agent, it is preferable that the vulcanizing accelerator be used in combination.

Examples of vulcanizing accelerators include thiazole-based agents, e.g., N-cyclohexylbenzothiazole-2-sulfenamide (example: "Sanceler CM" (trade name; produced by SANSHIN CHEMICAL INDUSTRY CO., LTD.)), N-oxydiethylene-2-benzothiazolesulfenamide, N,N'-diisopropyl-2-benzothiazolesulfenamide, 2-mercaptobenzothiazole (example: "Sanceler M" (trade name; produced by SANSHIN CHEMICAL INDUSTRY CO., LTD.)), 2-(4-morphorinodithio)benzothiazole (example: "NOCCELER MDB-P" (trade name; produced by OUCHI SHINKO CHEMICAL INDUSTRIAL CO., LTD.)), 2-(2,4-dinitrophenyl)mercaptobenzothiazole, 2-(2,6-diethyl-4-morphorinothio)benzothiazole, dibenzothiazyl disulfide, and cyclohexylamine salt of 2-mercaptobenzothiazole (example: "Sanceler HM" (trade name; produced by SANSHIN CHEMICAL INDUSTRY CO., LTD.));

guanidine-based agents, e.g., diphenylguanidine, triphenylguanidine, and di-ortho-tolylguanidine; aldehydeamine-based agents, e.g., acetaldehyde-aniline condensate and butylaldehyde-aniline condensate; imidazoline-based agents, e.g., 2-mercaptoimidazoline; thiourea-based agents, e.g., diethylthiourea and dibutylthiourea;

thiuram-based agents, e.g., tetramethylthiuram monosulfide (example: "NOCCELER TS" (trade name; produced by OUCHI SHINKO CHEMICAL INDUSTRIAL CO., LTD.)), tetramethylthiuram disulfide (example: "Sanceler TT" (trade name; produced by SANSHIN CHEMICAL INDUSTRY CO., LTD.)), tetraethylthiuram disulfide (example: "Sanceler TET" (trade name; produced by SANSHIN CHEMICAL INDUSTRY CO., LTD.)), dipentamethylenethiuram tetrasulfide (example: "Sanceler TRA" (trade name; produced by SANSHIN CHEMICAL INDUSTRY CO., LTD.)), and tetrakis(2-ethylhexyl)thiuram disulfide (example: "NOCCELER TOT" (trade name; produced by OUCHI SHINKO CHEMICAL INDUSTRIAL CO., LTD.));

dithioic acid salt-based agents, e.g., zinc dimethyldithiocarbamate (example: "Sanceler PZ" (trade name; produced by SANSHIN CHEMICAL INDUSTRY CO., LTD.)), zinc diethyldithiocarbamate, zinc dibutyldithiocarbamate (example: "Sanceler BZ" (trade name; produced by SANSHIN CHEMICAL INDUSTRY CO., LTD.)), tellurium diethyldithiocarbamate (example: "Sanceler TE" (trade name; produced by SANSHIN CHEMICAL INDUSTRY CO., LTD.)), and zinc dibenzyldithiocarbamate (example: "NOCCELER ZTC" (trade name; produced by OUCHI SHINKO CHEMICAL INDUSTRIAL CO., LTD.));

thiourea-based agents, e.g., ethylenethiourea (example: "Sanceler 22-C" (trade name; produced by SANSHIN CHEMICAL INDUSTRY CO., LTD.)) and N,N'-dibutylthiourea (example: "Sanceler BUR" (trade name; produced by SANSHIN CHEMICAL INDUSTRY CO., LTD.); and xanthate-based agents, e.g., zinc dibutylxanthate.

The amount of blend of the vulcanizing accelerator is preferably 0.1 to 10 parts by mass, more preferably 0.3 to 7 parts by mass, and further preferably 0.5 to 5 parts by mass relative to 100 parts by mass of Rubber component (I), e.g., the copolymer (I-1). It is preferable that the amount of blend of the vulcanizing accelerator be within the range because the rubber composition exhibits excellent cross-linking characteristics and there is no bloom on the surface of the resulting cross-linked foam.

<<Cross-Linking Aid>>

The cross-linking aid can be selected appropriately in accordance with the use thereof. One type may be used alone, or at least two types may be used in combination. Examples of cross-linking aids include magnesium oxide, zinc white (example: zinc oxide, e.g., "META-Z102" (trade name; produced by Inoue Calcium Corporation)); quinone dioxime compounds, e.g., p-quinonedioxime; acrylic compounds, e.g., ethylene glycol dimethacrylate and trimethylolpropane trimethacrylate; allyl compounds, e.g., diallyl phthalate and triallyl isocyanurate; other maleimide compounds; and divinylbenzene. The amount of blend of the cross-linking aid is preferably 0.5 to 10 parts by mass relative to 100 parts by mass of Rubber component (I), e.g., the copolymer (I-1).

<<Reinforcing Agent and Inorganic Filler>>

The rubber composition according to the present invention may be blended with the reinforcing agent and/or the inorganic filler for the purpose of improving the mechanical properties, e.g., the tensile strength, the tear strength, and the abrasion resistance, of the rubber composition.

Examples of commercially available reinforcing agents include "Asahi #55G", "Asahi #50G", and "Asahi #50HG" (trade name; produced by ASAHI CARBON CO., LTD.) and carbon black, e.g., "SEAST (trade name)": SRF, GPF, FEF, MAF, HAF, ISAF, SAF, FT, MT, and the like (produced by TOKAI CARBON CO., LTD.)); agents produced through surface treatment of these carbon black with a silane coupling agent or the like, silica, activated calcium carbonate, fine powder talc, and fine powder silicic acid. Among them, "Asahi #55G", "Asahi #50G", "Asahi #50HG", and carbon black of "SEAST HAF" are preferable.

Examples of inorganic fillers include light calcium carbonate, heavy calcium carbonate, talc, and clay. Among them, heavy calcium carbonate is preferable. Examples of heavy calcium carbonate include commercially available "Whiton SB" (trade name; produced by SHIRAISHI CALCIUM KAISHA, LTD.).

The total amount of blend of the reinforcing agent and the inorganic filler is preferably 1 to 300 parts by mass, more preferably 10 to 250 parts by mass, and further preferably 10 to 200 parts by mass relative to 100 parts by mass of Rubber component (I), e.g., the copolymer (I-1). It is preferable that the amount of blend be within the range because the rubber composition is excellent in kneading workability, and the resulting foamed material is excellent in mechanical properties (example: strength and flexibility) and compression set.

<<Softener>>

The softener can be selected appropriately in accordance with the use thereof. One type may be used alone, or at least two types may be used in combination. Examples of softeners include petroleum-based softeners, e.g., process oil (example: "Diana process oil PW-380" (trade name; produced by Idemitsu Kosan Co., Ltd), "Diana process oil PS-430" (trade name; produced by Idemitsu Kosan Co., Ltd)), lubricating oil, paraffin oil, liquid paraffin, petroleum asphalt, and vaseline; coal tar-based softeners, e.g., coal tar and coal tar pitch; fatty oil-based softeners, e.g., castor oil, linseed oil, rapeseed oil, soybean oil, and coconut oil; wax, e.g., bees wax, carnauba wax, and lanolin; fatty acids or salts thereof, e.g., ricinoleic acid, palmitic acid, stearic acid, barium stearate, calcium stearate, and zinc laurate; naphthenic acid, pine oil, and rosin, or derivatives thereof; synthetic polymer materials, e.g., terpene resins, petroleum resins, and coumaroneindene resins; ester-based softeners, e.g., dioctyl phthalate, dioctyl adipate, and dioctyl sebacate; and, in addition, microcrystalline wax, liquid thiokol, hydrocarbon-based synthetic lubricating oil, tall oil, and substitute (factice). Among them, petroleum-based softeners are preferable, and in particular process oil is preferable.

The amount of blend of the softener can be selected appropriately in accordance with the use thereof. The amount of blend of the softener is preferably 250 parts by mass or less, more preferably 200 parts by mass or less, and more preferably 150 parts by mass or less relative to 100 parts by mass of Rubber component (I), e.g., the copolymer (I-1).

<<Antioxidant (Stabilizer)>>

The product life can be increased by blending the antioxidant to the rubber composition according to the present invention. Examples of antioxidants include previously publicly known antioxidants, e.g., amine-based antioxidants, phenol-based antioxidants, and sulfur-based antioxidants. One type of the antioxidant may be used alone or at least two types may be used in combination.

Specific examples of antioxidants include aromatic secondary amine-based antioxidants, e.g., phenylbutylamine and N,N'-di-2-naphthyl-p-phenylenediamine; phenol-based antioxidants, e.g., dibutylhydroxytoluene and tetrakis[methylene(3,5-di-t-butyl-4-hydroxy)hydrocinnamate]methane; thioether-based antioxidants, e.g., bis[2-methyl-4-(3-n-alkylthiopropionyloxy)-5-t-butylphenyl]sulfide; dithiocarbamate-based antioxidants, e.g., nickel dibutyldithiocarbamate; and sulfur-based antioxidants, e.g., 2-mercaptobenzoylimidazole, zinc salt of 2-mercaptobenzimidazole, dilaurylthiodipropionate, and distearylthiodipropionate.

The amount of blend of the antioxidant is preferably 0.5 to 10 parts by mass, more preferably 0.5 to 7 parts by mass, and further preferably 1 to 5 parts by mass relative to 100 parts by mass of Rubber component (I), e.g., the copolymer (I-1). It is preferable that the amount of blend of the antioxidant be within the range because there is no bloom on the surface of the resulting cross-linked foam and, furthermore, cross-linking is not inhibited.

<<Processing Aid>>

As for the processing aid, those generally blended as the processing aid into rubber compositions can be used widely. Examples include fatty acid derivatives (example: "Struktol WB16", "Struktol WB212 (trade name; produced by S&S JAPAN Co., Ltd.), ricinoleic acid, stearic acid, palmitic acid, lauric acid, barium stearate, zinc stearate, and calcium stearate, and esters. Fatty acid derivatives and stearic acid are preferable.

The amount of blend of the processing aid is preferably 15 parts by mass or less, more preferably 10 parts by mass or less, and further preferably 7 parts by mass or less relative to 100 parts by mass of Rubber component (I), e.g., the copolymer (I-1). It is preferable that the amount of blend of the processing aid be within the range because there is no bloom on the surface of the resulting cross-linked foam and, furthermore, cross-linking is not inhibited.

<<Activator>>

The activator can be selected appropriately in accordance with the use thereof. One type may be used alone, or at least two types may be used in combination. Examples of activators include amines, e.g., di-n-butylamine, dicyclohexylamine, monoethanolamine, "Acting B" (trade name; produced by Yoshitomi Pharmaceutical Industries Ltd.), and "Acting SL" (trade name; produced by Yoshitomi Pharmaceutical Industries Ltd.); activators, e.g., diethylene glycol, polyethylene glycol (example: "PEG#4000" (produced by Lion Corporation)), lecithin, triarylate mellitate, and zinc compounds of aliphatic and aromatic carboxylic acids (example: "Struktol activator 73", "Struktol IB 531", and "Struktol FA 541" (trade name; produced by Schill & Seilacher)); zinc peroxide adjusted substances, e.g., "ZEONET ZP" (trade name; produced by ZEON Corporation); octadecyltrimethylammonium bromide, synthetic hydrotalcite, and special quaternary ammonium compounds (example: "Arquad 2HT-F" (trade name; Lion Akzo Co., ltd.). Among them, polyethylene glycol (example: "PEG#4000" (produced by Lion Corporation)) and "Arquad 2HT-F" are preferable.

The amount of blend of the activator is preferably 0.3 to 5 parts by mass, more preferably 0.3 to 3 parts by mass, and further preferably high molec 0.5 to 3 parts by mass relative to 100 parts by mass of Rubber component (I), e.g., the copolymer (I-1).

<<Moisture Absorbent>>

The moisture absorbent can be selected appropriately in accordance with the use thereof. One type may be used alone, or at least two types may be used in combination. Examples of moisture absorbent include calcium oxide (example: VESTA-18 (trade name; produced by Inoue Calcium Corporation)), silica gel, sodium sulfate, molecular sieve, zeolite, and white carbon. Among them, calcium oxide is preferable.

The amount of blend of the moisture absorbent is preferably 0.5 to 20 parts by mass, more preferably 0.5 to 15 parts by mass, and further preferably 1 to 15 parts by mass relative to 100 parts by mass of Rubber component (I), e.g., the copolymer (I-1).

<Method for Preparing Rubber Composition>

The rubber composition according to the present invention can be prepared by a common method for preparing a rubber compound. For example, the rubber composition according to the present invention can be prepared by kneading Rubber component (I), e.g., the copolymer (I-1), and other components, as necessary, at predetermined temperature and time (example: 80° C. to 200° C., 3 to 30 minutes) by using a previously known kneading machine, e.g., a mixer or a kneader, adding Foaming agent (II) and, as necessary, a cross-linking agent, a vulcanizing accelerator, and the like to the resulting kneaded material, and kneading by using a roll at predetermined temperature and time (example: roll temperature 30° C. to 80° C., 1 to 30 minutes).

The rubber composition has excellent workability in a kneading machine, extrusion moldability, in-mold moldability, injection moldability, and the like. The rubber composition according to the first embodiment of the present invention has excellent workability in a kneading machine and extrusion foam moldability and, therefore, is used for the purpose of extrusion foam molding favorably. The rubber composition according to the second embodiment of the present invention has excellent workability in a kneading machine and in-mold foam moldability and, therefore, is used for the purpose of in-mold foam molding favorably. The rubber composition according to the third embodiment of the present invention has excellent workability in a kneading machine and moldability and, therefore, is used for the purpose of molding favorably.

[Foamed Material]

The foamed material according to the present invention is produced by foaming the above-described rubber composition. It is preferable that the foamed material according to the present invention be a cross-linked foam obtained by subjecting the above-described rubber composition to cross-linking and foaming from the viewpoints of shape retainment and rubber elasticity.

Hereafter a (cross-linked) foamed material obtained by foaming the rubber composition according to the ith embodiment of the present invention may be referred to as "the ith (cross-linked) foamed material according to the present invention", and the manufacturing method therefor may be referred to as "the ith execution aspect" (i represents an integer of 1 to 3).

It is preferable that a formed material according to the first embodiment of the present invention be a cross-linked foam obtained by subjecting the rubber composition according to the first embodiment of the present invention to cross-linking and foaming from the viewpoints of shape retainment and rubber elasticity.

It is preferable that a formed material according to the second embodiment of the present invention be a cross-linked foam obtained by subjecting the rubber composition according to the second embodiment of the present invention to cross-linking and foaming from the viewpoints of retainment of fluidity in a mold and rubber elasticity.

It is preferable that a formed material according to the third embodiment of the present invention be a cross-linked foam obtained by subjecting the rubber composition according to the third embodiment of the present invention to cross-linking and foaming from the viewpoints of shape retainment and rubber elasticity.

Examples of foaming methods include a method in which Water (B) in the composition (in Foaming agent (II)) is evaporated by heating the above-described rubber composition. From the viewpoints of the evaporation temperature of water and the cross-linking reaction temperature, the heating temperature is usually 100° C. to 300° C. and the heating time is usually 1 to 30 minutes, preferably 3 to 30 minutes, and further preferably 3 to 20 minutes. As for the heating method, for example, the rubber composition may be introduced into a heating bath with the heating mode described later.

From the viewpoints of the evaporation temperature of water and the cross-linking reaction temperature, in the first execution aspect, the heating temperature is usually 130° C. to 300° C., preferably 140° C. to 280° C., and further preferably 150° C. to 270° C. In the second execution aspect, the heating temperature is usually 100° C. to 300° C., preferably 110° C. to 280° C., and further preferably 120° C. to 270° C. In the third execution aspect, the heating temperature is usually 100° C. to 300° C., preferably 110° C. to 280° C., and further preferably 120° C. to 270° C.

Examples of cross-linking and foaming methods include (i) a method in which the rubber composition including a cross-linking agent (example: rubber component according to the first embodiment or third embodiment of the present invention) is preformed into a predetermined shape, while heating is performed at the same time with the preforming, (ii) a method in which the preforming is performed and, subsequently, the resulting preformed material is introduced into a heating bath and is heated, and (iii) a method in which the preforming is performed and, subsequently, the resulting preformed material is irradiated with electron beams. In the cross-linking and foaming method according to the items (i) and (ii), a vulcanizing accelerator and/or a cross-linking aid can be used together with a cross-linking agent, as necessary.

Examples of molding machines used for preforming include extruders, press molding machines, injection molding machines, transfer molding machines, and calender rolls. Among them, the extruder is particularly preferably used in the first execution aspect, and the injection molding machine and the transfer molding machine are particularly preferably used in the third execution aspect.

In the case where the extruder is used, extrusion is performed under the condition of the die temperature of usually 50° C. to 120° C., and preferably 60° C. to 110° C. and under the condition of the cylinder temperature of usually 40° C. to 100° C., and preferably 50° C. to 90° C. from the viewpoint of prevention of burn (cross-linking) in the extruder.

Examples of heating baths (cross-linking baths) include heating baths with heating modes of hot air, steam, glass beads fluidized-bed, UHF (ultrahigh frequency electromagnetic wave), LCM (hot molten salt bath), and the like.

In the cross-linking and foaming method according to the items (i) and (ii), a vulcanizing accelerator and/or a cross-linking aid can be used together with a cross-linking agent, as necessary. From the viewpoints of the evaporation temperature of water and the cross-linking reaction temperature, the heating temperature is usually 100° C. to 300° C. and the heating time is usually 1 to 30 minutes, preferably 3 to 30 minutes, and further preferably 3 to 20 minutes. In foam molding and cross-linking of the rubber composition, a mold may be used, or no mold may be used. In the case where no mold is used, the rubber composition is usually continuously subjected to foam molding and cross-linking.

In the cross-linking and foaming method according to the item (iii), electron beams usually having energy of 0.1 to 10 MeV may be applied in such a way that the absorbed dose becomes usually 0.5 to 35 Mrad, preferably 0.5 to 20 Mrad, and further preferably 1 to 10 Mrad. In this case, foaming of the rubber composition is induced at the stage prior to irradiation or the stage after the irradiation.

For example, a cross-linked foam can be obtained by extruding the rubber composition according to the first embodiment of the present invention by the extrusion molding method and, thereafter, inducing cross-linking and foaming by performing heating the resulting extrusion molded material in a heating bath (cross-linking bath) at, for example, normal pressure. In the first execution aspect, from the viewpoints of the evaporation temperature of water and the cross-linking reaction temperature, the heating temperature is usually 130° C. to 300° C., preferably 140° C. to 280° C., and further preferably 150° C. to 270° C., and the heating time is usually 1 to 30 minutes, preferably 3 to 30 minutes, and further preferably 3 to 20 minutes.

For example, a cross-linked foam can be obtained by injecting the rubber composition according to the third embodiment of the present invention into a mold (example: metallic mold) by the molding method (example: injection molding method, transfer molding method) and inducing cross-linking and foaming by performing heating in the mold. In the third execution aspect, the mold temperature is usually 100° C. to 300° C., preferably 110° C. to 280° C., and further preferably 120° C. to 270° C., and the heating time is usually 1 to 30 minutes, preferably 3 to 30 minutes, and further preferably 3 to 20 minutes.

In the second execution aspect, examples of cross-linking and foaming methods include the in-mold foam molding method in which the rubber composition according to the second aspect of the present invention is filled into a mold and heating is performed to induce cross-linking and foaming. In particular, it is preferable that a two-step in-mold foam molding method be used for production of a cross-linked foam with a high foaming ratio.

The two-step in-mold foam molding method includes a first foaming step to fill the rubber composition according to the second embodiment of the present invention into a primary mold, performing heating under pressure and, subsequently, reduce the pressure, so as to induce foaming and a second foaming step to put the primary foamed material obtained by the first foaming step into a secondary mold and perform heating at normal pressure, so as to induce foaming. After the second foaming step is finished, the inside of the secondary mold is cooled, and a secondary foamed material is taken off the secondary mold, so that a cross-linked foam having a predetermined specific gravity is obtained.

According to this two-step foaming, foaming is not induced up to a final foaming ratio at a time, but foaming expansion is induced in two steps sequentially. Therefore, even in the case of a high foaming ratio, cracking and the like due to rapid expansion do not occur and a cross-linked foam having good quality is obtained.

For example, a closed mold is used as the primary mold. As for the foaming condition in the primary mold, the mold temperature is usually 100° C. to 180° C., and preferably 110° C. to 160° C., the heating time is usually 1 to 30 minutes, and preferably 3 to 30 minutes, and the pressure is usually 1 to 200 MPa, and preferably 10 to 150 MPa. The rubber composition in the inside of the closed primary mold comes into a pressurized state. After the above-described time is elapsed, for example, the primary mold still in the high-temperature state is released from sealing and is decompressed to, for example, normal pressure, so as to induce primary foaming into a predetermined size. The resulting foamed material is taken off the primary mold, so that a primary foamed material can be obtained.

For example, an unclosed mold is used as the secondary mold. As for the foaming condition in the secondary mold, the mold temperature is usually 140° C. to 240° C., and preferably 150° C. to 230° C., and the heating time is usually 1 to 30 minutes, and preferably 3 to 30 minutes. The primary foamed material in the inside of the unclosed secondary mold is heated at normal pressure, so as to be secondarily foamed. After the above-described time is elapsed, for example, cooling is performed by passing water at ambient temperature through a heat medium flow path in the mold. The secondary foamed material is taken off the secondary mold, so that a predetermined cross-linked foam can be obtained.

[Properties of Foamed Material]

In the present invention, water is uniformly dispersed in the rubber composition, and a cross-linked foam having excellent properties and appearance and the like can be obtained by setting the condition of foam molding appropriately, as described above.

The specific gravities of the foamed material and the cross-linked foam according to the present invention are usually 0.05 to 1.1, preferably 0.07 to 1.1, and more preferably 0.07 to 1.0. The cross-linked foam according to the present invention is obtained without inhibition of cross-linking during production thereof and, therefore, has excellent rubber elasticity.

The specific gravities of the foamed material and the cross-linked foam according to the first embodiment of the present invention are usually 0.90 or less, preferably 0.85 to 0.40, and more preferably 0.85 to 0.50. The rubber composition according to the first embodiment of the present invention is excellent in balance between the network formation state (rate) and the evaporation rate of water during production thereof, so that outgassing is suppressed and a cross-linked foam having a low specific gravity can be obtained.

The surface roughness of the cross-linked foam according to the first embodiment of the present invention is usually 45 µm or less, preferably 5 to 40 µm, and more preferably 5 to 35 µm. The rubber composition according to the first embodiment of the present invention is excellent in balance between the network formation state (rate) and the evaporation rate of water during production thereof, so that a cross-linked foam having excellent surface smoothness can be obtained.

The specific gravities of the foamed material and the cross-linked foam according to the second embodiment of the present invention are usually 0.7 or less, preferably 0.7 to 0.1, and more preferably 0.7 to 0.2. The rubber composition according to the second embodiment of the present invention is excellent in balance between the network formation state (rate) and the foaming rate of water during production thereof, so that outgassing is suppressed and a cross-linked foam having a low specific gravity can be obtained.

The specific gravities of the foamed material and the cross-linked foam according to the third embodiment of the present invention are usually 0.7 or less, preferably 0.7 to 0.3, and more preferably 0.7 to 0.4. The rubber composition according to the third embodiment of the present invention is excellent in balance between the cross-linking rate and the foaming rate of water during production thereof, so that outgassing is suppressed and a cross-linked foam having a low specific gravity can be obtained.

The surface roughness at the end portion of the cross-linked foam according to the third embodiment of the present invention is usually 40 µm or less, preferably 5 to 30 µm, and more preferably 5 to 23 µm. The rubber composition according to the third embodiment of the present invention is excellent in the fluidity and is excellent in balance between the cross-linking rate and the foaming rate of water in cross-linking and foaming, so that a cross-linked foam having excellent surface smoothness especially at the end portion can be obtained.

In this regard, details of the measurement conditions of the specific gravity and the surface roughness are as described in the examples.

[Use of Foamed Material]

The foamed material and the cross-linked foam according to the present invention are favorably used for rubber molded articles, for example, highly-foamed sponges, heat-insulating sponges, e.g., air conditioner pipe heat-insulating materials, dam rubbers, automobile sealing materials, e.g., glass run channels and weather strip sponges, sealing materials for construction materials, packing materials, gaskets, and roll materials and sealing materials for OA equipment.

In particular, the cross-linked foam according to the first embodiment of the present invention can be prepared by the extrusion foam molding, exhibits excellent rubber properties and, therefore, is suitable for sponges, e.g., automobile weather strip sponges. Specific examples of automobile weather strip sponges include sponges for door sponge, sponges for opening trim, sponges for hood sealing, and sponges for trunk sealing.

In particular, the cross-linked foam according to the second embodiment of the present invention can be prepared by the in-mold foam molding, exhibits excellent rubber properties and, therefore, is suitable for, for example, cushioning materials or heat insulating materials for automobiles, constructions, and electric products (electric equipment) and gasket sponges, and is particularly suitable for cushioning materials or heat insulating materials for automobiles.

In particular, the cross-linked foam according to the third embodiment of the present invention can be prepared by the molding (example: transfer molding, injection molding), exhibits excellent rubber properties and, therefore, is suitable for, for example, corner portion connection parts of automobile weather strips.

EXAMPLES

The present invention will be described in further detail with reference to the examples. However, the present invention is not limited to these examples. In this regard, in the following descriptions of examples and the like, the term "part" refers to "part by mass" unless otherwise specified.

<Example of Foaming Agent>

Examples and the like of foaming agent will be described below.

Example 1A

A foaming agent was prepared by mixing 100 g of water-absorbing resin "Sky Gel" (produced by Mebiol Inc.) serving as High molecular weight compound (A) and 500 g of pure water serving as Water (B) in a 1-L beaker.

Examples 2A to 6A, Comparative Examples 1A to 3A

Foaming agents of Examples 2A to 6A and foaming agents of Comparative examples 1A to 3A were obtained in the same manner as in Example 1A except that, in Example 1A, the types and the blending ratios of High molecular weight compound (A) and Water (B) were changed as described in Table 1. The properties of the foaming agents are shown in Table 1.

TABLE 1

| | | Example 1A | Example 2A | Example 3A | Example 4A | Example 5A | Example 6A | Comparative example 1A | Comparative example 2A | Comparative example 3A |
|---|---|---|---|---|---|---|---|---|---|---|
| Blend composition of foaming agent (unit: g) | High molecular weight compound A1 (*1) | 100 | 5 | 2 | — | — | — | 300 | 0.5 | — |
| | High molecular weight compound A2 (*2) | — | — | — | 100 | 5 | 2 | — | — | — |
| | Pure water | 500 | 500 | 600 | 500 | 500 | 600 | 300 | 500 | 500 |

TABLE 1-continued

|  |  | Example 1A | Example 2A | Example 3A | Example 4A | Example 5A | Example 6A | Comparative example 1A | Comparative example 2A | Comparative example 3A |
|---|---|---|---|---|---|---|---|---|---|---|
| Properties of foaming agent | Water content/ percent by mass | 83.3 | 99.0 | 99.7 | 83.3 | 99.0 | 99.7 | 50 | 99.9 | 100 |
|  | Storage modulus G'/Pa | $1.1 \times 10^5$ | $8.5 \times 10^2$ | $2.5 \times 10^2$ | $2.3 \times 10^5$ | $1.8 \times 10^3$ | $4.1 \times 10^2$ | $2.3 \times 10^6$ | $5.3 \times 10^1$ | measurement was not possible |
|  | Dispersibility | AA | AA | AA | AA | AA | AA | BB | CC | CC |

(*1) Water-absorbing resin "Sky Gel" (produced by Mebiol Inc.): polyacrylic acid-based water-absorbing resin, saturated water absorption (375 g/g)
(*2) Water-absorbing resin "SANFRESH ST-573" (produced by Sanyo Chemical Industries, Ltd.): polyacrylic acid-based water-absorbing resin, saturated water absorption (437 g/g)

Example 7A

A foaming agent was prepared by mixing 10 g of water-absorbing resin "SANFRESH ST-573" (produced by Sanyo Chemical Industries, Ltd.; polyacrylic acid-based water-absorbing resin, saturated water absorption (437 g/g)) serving as High molecular weight compound (A) and 500 g of pure water serving as Water (B) in a 1-L beaker. The water content of the resulting foaming agent was 98.0 percent by mass, and the storage modulus (G') was $1.6 \times 10^3$.

<<Properties of Foaming Agent>>

Each property of the foaming agent was measured following the procedure described below.

[Saturated Water Absorption]

The saturated water absorption of High molecular weight compound (A) was measured as described below.

High molecular weight compound (A) used for the measurement was dried in advance at 60° C.±5° C. under reduced pressure (less than 1 mmHg) for 24 hours. An unwoven bag (60 mm×80 mm) was charged with 0.02 g of High molecular weight compound (A) powder uniformly, and the resulting bag was immersed in 500 mL of ion-exchanged water (electrical conductivity 5 μS/cm or less) at a temperature controlled to be 25° C. The bag was pulled up after being stood for 24 hours, and water was drained for 3 minutes by using a centrifuge at 250 G. Thereafter, the mass $W_2$ (g) of the bag including the powder of High molecular weight compound (A) was measured. The same operation was performed without using the powder of High molecular weight compound (A) and the mass $W_1$ (g) at that time was measured. The saturated water absorption (g/g) was calculated from the masses $W_1$ and $W_2$ on the basis of the following formula.

saturated water absorption (g/g)=($W_2$ (g)−$W_1$ (g))/
mass of High molecular weight compound (A)
(0.02 g)

[Water Content]

The water content of the foaming agent was calculated on the basis of the following formula.

water content=(mass of water)/(total mass of foaming agent)×100(%)

[Storage Modulus (G')]

The storage modulus (G') of the foaming agent was measured by using a viscoelasticity meter (ARES, produced by TA Instruments). Specifically, 5 g of sample (foaming agents obtained in examples and comparative examples) was compressed by using a parallel plate instrument having a diameter of 25 mm to a thickness of 3 mm (where, the sample overflowed the disc of the parallel plate instrument was wiped). Thereafter, the frequency dependence of the modulus of elasticity was measured under the following condition, and the storage modulus (G') at a frequency of 5 rad/s was measured. Orchestrator (produced by TA Instruments) was used as data processing software.

Geometry: parallel plate

Measurement temperature: 20° C.

Frequency: 0.05 to 100 rad/sec

Distortion rate: 0.5%

[Dispersibility of Foaming Agent in Rubber Composition]

MIXTRON BB MIXER (Type BB-4, produced by Kobe Steel, Ltd., volume 2.95 L, rotor 4WH) was used, and 5 parts by mass of "META-Z102" (trade name; produced by Inoue Calcium Corporation) serving as the cross-linking aid, 2 parts by mass of stearic acid serving as the processing aid, 2 part by mass of "PEG#4000" (trade name; polyethylene glycol, produced by Lion Corporation) serving as the activator, 75 parts by mass of "Asahi #50G" (trade name; produced by ASAHI CARBON CO., LTD.) serving as the reinforcing agent, and 45 parts by mass of "Diana process oil PS-430" (trade name; produced by Idemitsu Kosan Co., Ltd) serving as the softener relative to 100 parts by mass of Mitsui EPT4021 (ethylene.propylene.diene copolymer rubber, produced by Mitsui Chemicals, Inc.) serving as the rubber component were kneaded. As for the kneading condition, the number of revolutions of the rotor was 50 rpm, the floating weight pressure was 3 kg/cm², the kneading time was 5 minutes, and the kneading discharge temperature was 148° C.

Then, it was ascertained that the temperature of the resulting kneaded material reached 40° C. Subsequently, 10 parts by mass of foaming agent obtained in Examples and Comparative examples were added to the kneaded material and kneading was performed by using an 8-inch open roll. As for the kneading condition, the roll temperature was front roll/rear roll=40° C./40° C., the roll peripheral speed was front roll/rear roll=18 rpm/15 rpm, and the roll gap was 4 mm.

The dispersion state of the foaming agent at that time was graded according to three ranks on the basis of the following criteria.

AA: Foaming agent was uniformly dispersed after 20 minutes of kneading.

BB: Foaming agent was not dispersed sufficiently, and foaming agent as-is remained after 20 minutes of kneading.

CC: Foaming agent was not dispersed at all, and kneading was not possible.

<Examples of Rubber Composition>

Examples and the like of the rubber composition will be described below.

Example 1B

MIXTRON BB MIXER (Type BB-4, produced by Kobe Steel, Ltd., volume 2.95 L, rotor 4WH) was used, and 5 parts by mass of "META-Z102" (trade name; produced by Inoue Calcium Corporation) serving as the cross-linking aid, 2 parts by mass of stearic acid serving as the processing aid, 2 parts by mass of "Struktol WB16" (trade name; produced by S&S JAPAN Co., Ltd.) serving as the processing aid, 75 parts by mass of "Asahi #50G" (trade name; produced by ASAHI CARBON CO., LTD.) serving as the reinforcing agent, and 45 parts by mass of "Diana process oil PW-380" (trade name; produced by Idemitsu Kosan Co., Ltd) serving as the softener relative to 100 parts by mass of Mitsui EPT4021 (ethylene.propylene.diene copolymer rubber, produced by Mitsui Chemicals, Inc.) serving as the rubber component were kneaded. As for the kneading condition, the number of revolutions of the rotor was 50 rpm, the floating weight pressure was 3 kg/cm$^2$, the kneading time was 5 minutes, and the kneading discharge temperature was 148° C.

Then, it was ascertained that the temperature of the resulting kneaded material reached 40° C. Subsequently, an 8-inch roll was used, and the kneaded material was kneaded with 0.5 part by mass of "Sanceler M", 1.5 parts by mass of "Sanceler BZ", 0.5 part by mass of "Sanceler TT", and 0.5 part by mass of "Sanceler TET" (they were trade names; produced by SANSHIN CHEMICAL INDUSTRY CO., LTD.) serving as the vulcanizing accelerator, 0.8 part by mass of sulfur serving as the cross-linking agent, and 10 parts by mass of foaming agent prepared in Example 1A. As for the kneading condition, the roll temperature was front roll/rear roll=40° C./40° C., the roll peripheral speed was front roll/rear roll=18 rpm/15 rpm, and the roll gap was 4 mm. Sheeting was performed after 10 minutes of kneading time, so that a rubber composition was obtained.

A transfer molding machine was used for cross-linking. The kneaded material obtained as described above was injected into a tube-shaped mold shown in FIG. 1 ((*a*): side view, (*b*): front view) over 10 seconds, and cross-link foaming was induced at a mold temperature of 180° C. for 3.5 minutes, so that a tube-shaped sponge was obtained.

Examples 2B to 6B, Comparative Examples 1B to 3B

Rubber compositions and tube-shaped sponges were obtained in the same manner as in Example 1B except that, in Example 1B, the foaming agent was changed to the foaming agents obtained in Examples and Comparative examples, as described in Table 2.

Each of the properties of the rubber compositions and the tube-shaped sponges are shown in Table 2.

TABLE 2

|  | Example |  |  |  |  |  | Comparative example (*4) |  |  |
|---|---|---|---|---|---|---|---|---|---|
|  | 1B | 2B | 3B | 4B | 5B | 6B | 1B | 2B | 3B |
| Foaming agent (*3) | Example 1A | Example 2A | Example 3A | Example 4A | Example 5A | Example 6A | Comparative example 1A | Comparative example 2A | Comparative example 3A |
| Properties of rubber composition |  |  |  |  |  |  |  |  |  |
| Minimum viscosity (Vm) | 6 | 7 | 6 | 6 | 6 | 7 | 6 | — | — |
| Scorch time (t5, min) | 7.3 | 6.5 | 7.0 | 7.1 | 7.0 | 6.3 | 7.3 | — | — |
| Properties of cross-linked foam (tube-shaped sponge) |  |  |  |  |  |  |  |  |  |
| Specific gravity | 0.62 | 0.55 | 0.57 | 0.60 | 0.52 | 0.54 | 1.2 (no foaming occurred) | — | — |
| Compression set (70° C., 197 hours) | 25 | 19 | 21 | 23 | 17 | 20 | — | — | — |

(*3) The type of foaming agent used for preparing the rubber composition. Example (Comparative example) i refers to a foaming agent obtained in Example (Comparative example) i.

(*4) The symbol "—" represents that a measurement was not possible.

In the rubber composition according to the present invention, the water foaming agent is uniformly dispersed and use of a chemical decomposition type foaming agent can be avoided. Therefore, there is no inhibition of cross-linking resulting from a foaming agent, and there is no mold pollution and environmental pollution caused by a foaming agent residue. Consequently, the first issue of the present invention can be solved.

Examples with Respect to Rubber Compositions According to the First to Third Embodiments The examples with respect to the rubber compositions according to the first to third embodiments will be described below.

Production Examples of Copolymer (I-1)

Production Example 1A

A polymerization reactor having a volume of 300 L and being provided with a mixing blade was used, and polymerization reaction of Component [A]: ethylene, Component [B]: propylene, Component [C-1]: 5-ethylidene-2-norbornene (ENB), and Component [C-2]: 5-vinyl-2-norbornene (VNB) was performed at 95° C. continuously.

Hexane (amount of feed 41 kg/h) was used as a polymerization solvent. Ethylene at an amount of feed of 5.9 kg/h, propylene at an amount of feed of 4.9 kg/h, ENB at an amount of feed of 1.7 kg/h, VNB at an amount of feed of 58 g/h, and hydrogen at an amount of feed of 6.8 NL/h were supplied to the polymerization reactor continuously.

The polymerization pressure was maintained at 1.5 MPa, and (t-butylamide)dimethyl($\eta^5$-2-methyl-s-indacen-1-yl)silane-titanium(II)1,3-pentadiene, which was represented by Formula (VIII) and which served as a main catalyst, at an amount of feed of 0.09 mmol/h and each of trityl tetrakis (pentafluorophenyl)borate [$(C_6H_5)_3CB(C_6F_5)_4$] at an amount of feed of 0.21 mmol/h and triisobutylaluminum at an amount of feed of 23 mmol/h, which served as co-catalysts, were supplied to the polymerization reactor continuously.

In this manner, a polymerization liquid containing 10.2 percent by mass of quatercopolymer (X1) composed of ethylene, propylene, ENB, and VNB was produced. In this regard, the main catalyst was synthesized in conformity with the method disclosed in International Publication No. 98/49212.

A small amount of methanol was added to the polymerization liquid drawn from the lower portion of the polymerization reactor, so as to terminate the polymerization reaction. After the copolymer was separated from the polymerization solvent by a steam stripping treatment, drying under reduced pressure was performed at 80° C. for one whole day and night. The configuration and properties of the resulting copolymer are shown in Table 3.

Production Examples 2A to 4A

Copolymers (X2) to (X4) were synthesized under the same condition as that in Production example 1A except that the amounts of feed of ethylene, propylene, ENB, VNB, and hydrogen were changed in Production example 1A. The configuration and properties of the resulting copolymer are shown in Table 3.

Production Example 1B

A polymerization liquid containing 14.2 percent by mass of quatercopolymer (Y1) composed of ethylene, propylene, ENB, and VNB and a copolymer was produced under the same condition as that in Production example 1A except that, in Production example 1A, hexane (amount of feed 41 kg/h) was used as the polymerization solvent, ethylene at an amount of feed of 5.3 kg/h, propylene at an amount of feed of 5.6 kg/h, ENB at an amount of feed of 1.3 kg/h, VNB at an amount of feed of 90 g/h, and hydrogen at an amount of feed of 15.5 NL/h were supplied to the polymerization reactor continuously, the polymerization pressure was maintained at 1.5 MPa, the main catalyst at an amount of feed of 0.06 mmol/h, and each of trityl tetrakis(pentafluorophenyl) borate [$(C_6H_5)_3CB(C_6F_5)_4$] at an amount of feed of 0.25 mmol/h and triisobutylaluminum at an amount of feed of 14 mmol/h, which served as co-catalysts, were supplied to the polymerization reactor continuously. The configuration and properties of the resulting copolymer are shown in Table 3.

Production Examples 2B to 4B

Copolymers (Y2) to (Y4) were synthesized under the same condition as that in Production example 1B except that the amounts of feed of ethylene, propylene, ENB, VNB, and hydrogen were changed in Production example 1B. The configuration and properties of the resulting copolymer are shown in Table 3.

Production Examples 1C to 3C

Copolymers (Z1) to (Z3) were synthesized under the same condition as that in Production example 1A except that the amounts of feed of ethylene, propylene, ENB, VNB, and hydrogen were changed in Production example 1A. The configuration and properties of the resulting copolymer are shown in Table 3.

TABLE 3

| | | Configuration and properties of copolymer | | | |
|---|---|---|---|---|---|
| | | Propylene structural unit percent by mole | ENB structural unit percent by mole | VNB structural unit percent by mole | Limiting viscosity [η] dL/g |
| Production example 1A | Copolymer (X1) | 39.8 | 2.80 | 0.32 | 3.40 |
| Production example 2A | Copolymer (X2) | 36.7 | 3.30 | 0.22 | 3.05 |
| Production example 3A | Copolymer (X3) | 44.9 | 4.41 | 0.15 | 2.30 |
| Production example 4A | Copolymer (X4) | 27.2 | 2.91 | 0.06 | 2.92 |
| Production example 1B | Copolymer (Y1) | 39.0 | 2.65 | 0.34 | 1.59 |
| Production example 2B | Copolymer (Y2) | 29.5 | 1.85 | 0.21 | 1.35 |
| Production example 3B | Copolymer (Y3) | 44.7 | 3.05 | 0.15 | 1.20 |
| Production example 4B | Copolymer (Y4) | 36.1 | 2.81 | 0.12 | 1.03 |
| Production example 1C | Copolymer (Z1)[*1] | 37.7 | 3.86 | — | 2.91 |
| Production example 2C | Copolymer (Z2)[*1] | 42.0 | 2.00 | — | 1.49 |
| Production example 3C | Copolymer (Z3)[*1] | 28.5 | 2.90 | — | 1.05 |

[*1]Only ENB was used as a nonconjugated polyene.

"Properties of Copolymer (I-1)"

Each property of the copolymer (I-1) was measured following the procedure described below.

[Contents (Percent by Mole) of Structural Unit [B], Structural Units [C-1] and [C-2], Structural Units [C-1'] and [C-2'], and the Like]

The contents were determined by a strength measurement with a $^{13}$C-NMR spectrometer.

Apparatus: Model ECX400P Nuclear Magnetic Resonance Spectrometer (produced by JEOL LTD.)

Measurement condition
Frequency: 100 MHz
Repetition period: 5.5 second
Integration times: 8,000 times
Measurement solvent: orthodichlorobenzene/benzene-$d_6$=4/1 (volume ratio)
Measurement temperature: 120° C.

[Limiting Viscosity [η]]

The limiting viscosities [η] of the copolymers (I-1), e.g., Copolymers (X) to (Z), were measured by using Automatic Limiting Viscosity tester produced by RIGO CO., LTD., at temperature: 135° C. in measurement solvent: decalin.

Examples of Rubber Composition According to First Embodiment

Example 1C

MIXTRON BB MIXER (Type BB-4, produced by Kobe Steel, Ltd., volume 2.95 L, rotor 4WH) was used, and 8 parts of "META-Z102" (trade name; produced by Inoue Calcium Corporation) serving as the cross-linking aid, 2 parts of stearic acid serving as the processing aid, 1 part of "PEG#4000" (trade name; polyethylene glycol, produced by Lion Corporation) and 2 parts of "Arquad 2HT-F" (trade name; produced by Lion Akzo Co., ltd.) serving as the activator, 97 parts of "Asahi #55G" (trade name; produced by ASAHI CARBON CO., LTD.) serving as the reinforcing agent, 60 parts of "Whiton SB" (trade name; produced by SHIRAISHI CALCIUM KAISHA, LTD.) serving as the inorganic filler, and 60 parts of "Diana process oil PS-430" (trade name; produced by Idemitsu Kosan Co., Ltd) serving as the softener relative to 100 parts of Copolymer (X1) serving as the rubber component produced in Production example 1A were kneaded. As for the kneading condition, the number of revolutions of the rotor was 50 rpm, the floating weight pressure was 3 kg/cm², the kneading time was 5 minutes, and the kneading discharge temperature was 156° C.

Then, it was ascertained that the temperature of the resulting kneaded material reached 40° C. Subsequently, a 14-inch roll was used, and the kneaded material was kneaded with 1.0 part of "Sanceler M", 1.0 part of "Sanceler HM", 1.0 part of "Sanceler TRA", 1.0 part of "Sanceler 22-C", and 0.5 part of "Sanceler TE" (they were trade names; produced by SANSHIN CHEMICAL INDUSTRY CO., LTD.) serving as the vulcanizing accelerator, 2 parts of sulfur serving as the cross-linking agent, 10 parts of foaming agent prepared in Example 7A serving as the foaming agent, and 5 parts of VESTA-18 (trade name; produced by Inoue Calcium Corporation) serving as the moisture absorbent. As for the kneading condition, the roll temperature was front roll/rear roll=40° C./40° C., the roll peripheral speed was front roll/rear roll=13 rpm/11.5 rpm, and the roll gap was 5 mm. Sheeting was performed after 8 minutes of kneading time, so that a rubber composition was obtained. Each property value of the rubber composition is shown in Table 4.

Subsequently, the resulting rubber composition was extruded by using an extruder having a diameter of 60 mm and being equipped with a tube-shaped die (inside diameter 12 mm, thickness 1.5 mm) under the condition of a die temperature of 80° C. and a cylinder temperature of 60° C., so as to be molded into the shape of a tube. The resulting molded material was introduced into a heating bath (cross-linking bath) immediately after the molding and was heated at a temperature of 250° C. for 5 minutes, so that cross-linking and foaming were induced and a tube-shaped sponge was obtained. Each property value of the tube-shaped sponge is shown in Table 4.

Examples 2C to 6C, Reference Examples 1C to 3C

Operations were performed in the same manner as in Example 1C except that, in Example 1C, the types and the amount of blend of the rubber component was changed as described in Table 4. Each of the property values of the rubber compositions and the tube-shaped sponges is shown in Table 4.

TABLE 4

| | | Example | | | | | | Reference example | | |
|---|---|---|---|---|---|---|---|---|---|---|
| | | 1C | 2C | 3C | 4C | 5C | 6C | 1C | 2C | 3C |
| (I) Rubber component*¹ | Copolymer (X1) | 100 | | | | 70 | | | 30 | |
| | Copolymer (X2) | | 100 | | | | 70 | | | 30 |
| | Copolymer (X3) | | | 100 | | | | | | |
| | Copolymer (X4) | | | | 100 | | | | | |
| | Copolymer (Z1) | | | | | 30 | 30 | 100 | 70 | 70 |
| (II) Foaming agent*² | Foaming agent (Example 7A) | 10 | 10 | 10 | 10 | 10 | 10 | 10 | 10 | 10 |
| (1) Properties of rubber composition | | | | | | | | | | |
| Unvulcanized properties | Vm | 48 | 42 | 39 | 45 | 43 | 41 | 45 | 42 | 40 |
| | t5 (min) | 2.2 | 2.3 | 2.1 | 2.0 | 2.1 | 2.2 | 2.1 | 2.2 | 2.5 |
| (2) Properties of rubber molded material (foamed material) | | | | | | | | | | |
| Specific gravity | | 0.75 | 0.79 | 0.83 | 0.85 | 0.81 | 0.81 | 1.04 | 0.96 | 0.97 |
| Surface smoothness of sponge (μm) | | 22.2 | 25.1 | 25.6 | 27.1 | 24.0 | 25.3 | 25.1 | 45.3 | 68.1 |
| Compression set (70° C., 22 hours) | | 18 | 20 | 19 | 22 | 21 | 20 | 28 | 42 | 41 |

*¹,*²Unit is part by mass. In Table, only the rubber component and the foaming agent are shown as blend components of the rubber composition.

The rubber compositions in Reference examples 1C to 3C can solve the first issue of the present invention. In addition, in the rubber compositions in Examples 1C to 6C (the rubber composition according to the first embodiment of the present invention), the water foaming agent is uniformly dispersed and, furthermore, the specific copolymer (X) is included as Rubber component (I), so that the workability in the kneading machine and the extrusion foam-moldability are further improved, and a cross-linked foam having more excellent appearance and lightweightness can be obtained. Consequently, the second issue of the present invention can be solved.

Examples of Rubber Composition According to Second Embodiment

Example 1D

MIXTRON BB MIXER (Type BB-4, produced by Kobe Steel, Ltd., volume 2.95 L, rotor 4WH) was used, and 8 parts of "META-Z102" (trade name; produced by Inoue Calcium Corporation) serving as the cross-linking aid, 2 parts of stearic acid serving as the processing aid, 1 part of "PEG#4000" (trade name; polyethylene glycol, produced by Lion Corporation) serving as the activator, 30 parts of "Asahi #50HG" (trade name; produced by ASAHI CARBON CO., LTD.) serving as the reinforcing agent, 40 parts of "Whiton SB" (trade name; produced by SHIRAISHI CALCIUM KAISHA, LTD.) serving as the inorganic filler, and 45 parts of "Diana process oil PS-430" (trade name; produced by Idemitsu Kosan Co., Ltd) serving as the softener relative to 100 parts of Copolymer (Y1) serving as the rubber component produced in Production example 1B were kneaded. As for the kneading condition, the number of revolutions of the rotor was 50 rpm, the floating weight pressure was 3 kg/cm², the kneading time was 8 minutes, and the kneading discharge temperature was 143° C.

Then, it was ascertained that the temperature of the resulting kneaded material reached 40° C. Subsequently, a 14-inch roll was used, and the kneaded material was kneaded with 0.8 part of "Sanceler M", 0.8 part of "Sanceler BZ", 0.8 part of "Sanceler PZ", and 0.8 part of "Sanceler BUR (they were trade names; produced by SANSHIN CHEMICAL INDUSTRY CO., LTD.) serving as the vulcanizing accelerator, 0.8 part of sulfur serving as the cross-linking agent, and 15 parts of foaming agent prepared in Example 7A serving as the foaming agent. As for the kneading condition, the roll temperature was front roll/rear roll=40° C./40° C., the roll peripheral speed was front roll/rear roll=13 rpm/11.5 rpm, and the roll gap was 5 mm. Sheeting was performed after 10 minutes of kneading time, so that a rubber composition was obtained. Each property value of the rubber composition is shown in Table 5.

Subsequently, 70 g of the rubber composition was filled into a closed primary mold (inside dimension: 100 mm×100 mm×6 mm), and heating was performed at 140° C. for 12 minutes (primary foaming condition). The primary mold was a closed type. Therefore, in this heating, the rubber composition in the inside came into a pressurized state. After the above-described time was elapsed, the primary mold still in a hot temperature state was released from sealing and was decompressed, so as to induce primarily foaming into a predetermined size. The resulting foamed article was taken off the primary mold, so that a primary foamed material was obtained.

Next, the primary foamed material was put into an unclosed secondary mold (inside dimension: 100 mm×100 mm×8 mm), and heating was performed at 170° C. for 5 minutes (secondary foaming condition). The secondary mold was an unclosed type. Therefore, in this heating, the primary foamed material in the inside was heated at normal pressure, so as to be secondarily foamed. After the above-described time was elapsed, cooling to room temperature was performed over 60 minutes by passing water at ambient temperature through a heat medium flow path in the mold. The secondary foamed material was taken off the secondary mold, so that a tabular sponge was obtained. Each property value of the tabular sponge is shown in Table 5.

Examples 2D to 5D, Reference Examples 1D to 3D

Operations were performed in the same manner as in Example 1D except that, in Example 1D, the types and the amount of blend of the rubber component was changed as described in Table 5. Each of the property values of the rubber compositions and the tabular-shaped sponges is shown in Table 5.

TABLE 5

|  |  | Example | | | | | Reference example | | |
|---|---|---|---|---|---|---|---|---|---|
|  |  | 1D | 2D | 3D | 4D | 5D | 1D | 2D | 3D |
| (I) Rubber component*¹ | Copolymer (Y1) | 100 |  |  |  | 70 |  |  | 30 |
|  | Copolymer (Y2) |  | 100 |  |  |  |  |  |  |
|  | Copolymer (Y3) |  |  | 100 |  |  |  |  |  |
|  | Copolymer (Y4) |  |  |  | 100 |  |  |  |  |
|  | Copolymer (Z2) |  |  |  |  | 30 | 100 |  | 70 |
|  | Copolymer (Z3) |  |  |  |  |  |  | 100 |  |
| (II) Foaming agent*² | Foaming agent (Example 7A) | 15 | 15 | 15 | 15 | 15 | 15 | 15 | 15 |
| (1) Properties of rubber composition | | | | | | | | | |
| Unvulcanized properties | Vm | 15 | 11 | 11 | 8 | 13 | 13 | 7 | 12 |
|  | t5 (min) | 10.5 | 10.5 | 9.9 | 11.4 | 11.1 | 12 | 9.3 | 10.1 |
| (2) Properties of rubber molded material (foamed material) | | | | | | | | | |
| Specific gravity |  | 0.55 | 0.62 | 0.59 | 0.66 | 0.64 | 0.91 | 1.03 | 0.90 |

*¹,*²Unit is part by mass. In Table, only the rubber component and the foaming agent are shown as blend components of the rubber composition.

The rubber compositions in Reference examples 1D to 3D can solve the first issue of the present invention. In addition, in the rubber compositions in Examples 1D to 5D (the rubber composition according to the second embodiment of the present invention), the water foaming agent is uniformly dispersed and, furthermore, the specific copolymer (Y) is included as Rubber component (I), so that the workability in the kneading machine and the in-mold foam-moldability are further improved, and a cross-linked foam having more excellent lightweightness can be obtained. Consequently, the third issue of the present invention can be solved.

Examples of Rubber Composition According to Third Embodiment

Example 1E

MIXTRON BB MIXER (Type BB-4, produced by Kobe Steel, Ltd., volume 2.95 L, rotor 4WH) was used, and 5 parts of "META-Z102" (trade name; produced by Inoue Calcium Corporation) serving as the cross-linking aid, 2 parts of stearic acid serving as the processing aid, 1 part of "Struktol WB212 (trade name; produced by S&S JAPAN Co., Ltd.) serving as the processing aid, 75 parts of "Asahi #50G" (trade name; produced by ASAHI CARBON CO., LTD.) serving as the reinforcing agent, and 50 parts of "Diana process oil PW-380" (trade name; produced by Idemitsu Kosan Co., Ltd) serving as the softener relative to 80 parts of Copolymer (Y1) produced in Production example 1B and 20 parts of Copolymer (X1) produced in Production example 1A, which served as the rubber component (total rubber component 100 parts), were kneaded. As for the kneading condition, the number of revolutions of the rotor was 50 rpm, the floating weight pressure was 3 kg/cm², the kneading time was 5 minutes, and the kneading discharge temperature was 153° C.

Then, it was ascertained that the temperature of the resulting kneaded material reached 40° C. Subsequently, an 8-inch roll was used, and the kneaded material was kneaded with 2.0 parts of "Sanceler CM" (trade name; produced by SANSHIN CHEMICAL INDUSTRY CO., LTD.), 1.0 part of "NOCCELER ZTC", and 2.0 parts of "NOCCELER TOT" (they were trade names; produced by OUCHI SHINKO CHEMICAL INDUSTRIAL CO., LTD.), which served as the vulcanizing accelerator, 0.8 part of sulfur serving as the cross-linking agent, and 10 parts of foaming agent prepared in Example 7A serving as the foaming agent. As for the kneading condition, the roll temperature was front roll/rear roll=40° C./40° C., the roll peripheral speed was front roll/rear roll=18 rpm/15 rpm, and the roll gap was 4 mm. Sheeting was performed after 10 minutes of kneading time, so that a rubber composition was obtained. Each property value of the rubber composition is shown in Table 6.

A transfer molding machine was used for cross-linking. The kneaded material obtained as described above was injected into a tube-shaped mold shown in FIG. 1 ((a): side view, (b) front view) over 10 seconds, and cross-link foaming was induced at a mold temperature of 190° C. for 3.5 minutes, so that a tube-shaped sponge was obtained. Each property value of the tube-shaped sponge is shown in Table 6.

Examples 2E to 4E, Reference Examples 1E to 4E

Operations were performed in the same manner as in Example 1E except that, in Example 1E, the types and the amount of blend of the rubber component was changed as described in Table 6. Each of the property values of the rubber compositions and the tube-shaped sponges is shown in Table 6.

excellent appearance and lightweightness can be obtained. Consequently, the third issue of the present invention can be solved.

"Properties of Rubber Composition and the Like"

A method for measuring each property of the rubber composition and the like will be described below.

[Property of Rubber Composition: Minimum Viscosity (Vm) and Scorch Time (t5, Min)]

The property test of the rubber composition was performed in conformity with JIS K6300. Specifically, a Mooney viscometer (Model SMV202 produced by SHIMADZU CORPORATION) was used and changes in Mooney viscosity were measured at 125° C. The minimum viscosity (Vm) was determined at the start of the measurement. Furthermore, the time elapsed until the viscosity increased by 5 points from the minimum viscosity Vm was determined, and this was specified to be the scorch time (t5, min).

[Property of Cross-Linked Foam: Specific Gravity]

In the first embodiment, the cross-linked foam (tube-shaped sponge) was cut, and in Examples 1B to 6B, Comparative examples 1B to 3B, and the third embodiment, a lower portion (flat portion) of the cross-linked foam (tube-shaped sponge) was cut. After cutting open to take on the shape of a sheet, a test piece of 20 mm×20 mm was stamped out, and stains on the surface were wiped off with alcohol. The resulting test piece was set in an automatic densimeter (Model M-1; produced by Toyo Seiki Seisaku-sho, Ltd.) in an atmosphere at 25° C. The specific gravity was measured on the basis of the difference between the mass in air and the mass in pure water.

In the second embodiment, a test piece of 20 mm×20 mm was stamped out from an upper portion of the cross-linked

TABLE 6

|  |  | Example | | | | Reference example | | | |
| --- | --- | --- | --- | --- | --- | --- | --- | --- | --- |
|  |  | 1E | 2E | 3E | 4E | 1E | 2E | 3E | 4E |
| (I) Rubber component*[1] | Copolymer (Y1) | 80 | 70 |  |  | 100 |  | 70 |  |
|  | Copolymer (Y4) |  |  | 70 | 60 |  |  |  |  |
|  | Copolymer (X1) | 20 |  | 30 |  |  |  |  |  |
|  | Copolymer (X3) |  | 30 |  | 40 |  | 100 | 30 |  |
|  | Copolymer (Z3) |  |  |  |  |  |  | 70 |  |
|  | Copolymer (Z1) |  |  |  |  |  |  |  | 30 |
| (II) Foaming agent*[2] | Foaming agent (Example 7A) | 10 | 10 | 10 | 10 | 10 | 10 | 10 | 10 |
| (1) Properties of rubber composition | | | | | | | | | |
| Unvulcanized properties | Vm | 11 | 9 | 9 | 11 | 7 | 26 | 10 | 13 |
|  | t5 (min) | 10.3 | 11.0 | 9.8 | 9.2 | 12.9 | 7.5 | 10.7 | 11.8 |
| (2) Properties of rubber molded material (foamed material) | | | | | | | | | |
| Specific gravity | | 0.58 | 0.60 | 0.55 | 0.58 | 0.76 | 1.02 | 0.72 | 0.81 |
| Surface smoothness at the end portion of sponge (μm) | | 14.6 | 13.1 | 18.2 | 17.2 | 45.3 | 24.1 | 60.3 | 40.8 |
| Compression set (70° C., 22 hours) | | 15 | 14 | 14 | 14 | 21 | 24 | 22 | 20 |

*[1],*[2]Unit is part by mass. In Table, only the rubber component and the foaming agent are shown as blend components of the rubber composition.

The rubber compositions in Reference examples 1E to 4E can solve the first issue of the present invention. In addition, in the rubber compositions in Examples 1E to 4E (the rubber composition according to the third embodiment of the present invention), the water foaming agent is uniformly dispersed and, furthermore, the specific copolymers (X) and (Y) are included as Rubber component (I), so that the workability in the kneading machine and the moldability are further improved, and a cross-linked foam having more foam (tabular sponge), and stains on the surface were wiped off with alcohol. The resulting test piece was set in the automatic densimeter (Model M-1; produced by Toyo Seiki Seisaku-sho, Ltd.) in an atmosphere at 25° C. The specific gravity was measured on the basis of the difference between the mass in air and the mass in pure water.

[Property of Cross-Linked Foam: Compression Set CS)]

The cross-linked foam (tube-shaped sponge) was cut into 30 mm in the length direction and was set in a die for measuring the compression set. The test piece was compressed in such a way that the height became half the height before application of the load. The test piece with the die was set in a gear oven at 70° C. and heat treatment was performed for 197 hours or 22 hours. Subsequently, the test piece was taken out, and was stood to cool for 30 minutes. Thereafter, the height of the test piece was measured, and the compression set (%) was calculated on the basis of the following formula.

compression set (%)={($t_0$−$t_1$)/($t_0$−$t_2$)}×100

$t_0$: height of test piece before test
$t_1$: height of test piece after being heat-treated and stood to cool for 30 minutes
$t_2$: height of test piece in the state of being set in measurement die

[Surface Smoothness of Cross-Linked Foam]

The surface roughness (Table 4) of the cross-linked foam (tube-shaped sponge) was expressed by converting surface unevenness of the upper surface of the cross-linked foam (tube-shaped sponge) into numbers by using a stylus type surface roughness measuring instrument. In practice, the cross-linked foam (tube-shaped sponge) was cut into the length of 50 mm. The value obtained by dividing a value (h1−h2) determined by subtracting "the total sum (h2) of the heights of concave portions having the minimum height to the tenth height in increasing order" among drawn portions from "the total sum (h1) of the heights of convex portions having the maximum height to the tenth height in decreasing order" by 10 was specified to be the surface roughness (μm) of the cross-linked foam (tube-shaped sponge).

[Surface Smoothness of Cross-Linked Foam End Portion]

The surface roughness (Table 6) of the cross-linked foam (tube-shaped sponge) end portion was expressed by converting surface unevenness of the upper surface of the cross-linked foam (tube-shaped sponge) into numbers by using a stylus type surface roughness measuring instrument. In practice, the end portion (length 50 mm) of the cross-linked foam (tube-shaped sponge) was cut. The value obtained by dividing a value (h1−h2) determined by subtracting "the total sum (h2) of the heights of concave portions having the minimum height to the tenth height in increasing order" among drawn portions from "the total sum (h1) of the heights of convex portions having the maximum height to the tenth height in decreasing order" by 10 was specified to be the surface roughness (μm) of the cross-linked foam (tube-shaped sponge) end portion.

The invention claimed is:

1. A method for manufacturing a foamed material, comprising foaming a rubber composition,
    wherein the rubber composition comprises 100 parts by mass of (I-1) an ethylene.α-olefin.nonconjugated polyene random copolymer and 0.5 to 300 parts by mass of (II) a foaming agent formed from at least (A) a compound having a saturated water absorption of 250 to 1,000 g/g in ion-exchanged water (25° C.) and (B) water, wherein a storage modulus (G') of the foaming agent (II), determined on the basis of a viscoelasticity measurement at a temperature of 20° C., is $8.0 \times 10^1$ to $1.0 \times 10^6$ Pa at a frequency of 5 rad/s,
    wherein the compound (A) has a cross-linked structure and the foaming agent (II) is a hydrogel holding the water (B) on the cross-linked structure of the compound (A),
    wherein 10 to 50 percent by mass of the copolymer (I-1) is a copolymer (X) containing structural units [A] derived from ethylene, structural units [B] derived from an α-olefin having the carbon number of 3 to 20, structural units [C-1] derived from a nonconjugated polyene, in which among carbon.carbon double bonds, only one carbon.carbon double bond polymerizable with a metallocene catalyst is present in one molecule, and structural units [C-2] derived from a nonconjugated polyene, in which among the carbon.carbon double bonds, two carbon.carbon double bonds polymerizable with a metallocene catalyst are present in one molecule, and satisfying the following requirements (1) to (3), and
    wherein 90 to 50 percent by mass of the copolymer (I-1) is a copolymer (Y) containing structural units [A'] derived from ethylene, structural units [B'] derived from an α-olefin having the carbon number of 3 to 20, structural units [C-1'] derived from a nonconjugated polyene, in which among carbon.carbon double bonds, only one carbon.carbon double bond polymerizable with a metallocene catalyst is present in one molecule, and structural units [C-2'] derived from a nonconjugated polyene, in which among the carbon.carbon double bonds, two carbon.carbon double bonds polymerizable with a metallocene catalyst are present in one molecule, and satisfying the following requirements (4) to (6),
    (1) the content of the structural units [B] is 10 to 50 percent by mole in 100 percent by mole of the total structural units of the copolymer (X),
    (2) the total content of the structural units [C-1] and the structural units [C-2] is 1.0 to 6.0 percent by mole in 100 percent by mole of the total structural units of the copolymer (X),
    (3) the limiting viscosity [η] measured in a decalin solution at 135° C. is 2.0 to 4.0 dL/g,
    (4) the content of the structural units [B'] is 10 to 50 percent by mole in 100 percent by mole of the total structural units of the copolymer (Y),
    (5) the total content of the structural units [C-1'] and the structural units [C-2'] is 1.0 to 6.0 percent by mole in 100 percent by mole of the total structural units of the copolymer (Y), and
    (6) the limiting viscosity [η] measured in a decalin solution at 135° C. is 0.8 to 1.8 dL/g.

2. The method according to claim 1, wherein in the copolymer (X),
    at least part of the structural units [C-1] are structural units derived from 5-ethylidene-2-norbornene (ENB) and the content of structural units derived from ENB is 1 to 5 percent by mole in 100 percent by mole of the total structural units of the copolymer (X), and
    at least part of the structural units [C-2] are structural units derived from 5-vinyl-2-norbornene (VNB) and the content of structural units derived from VNB is 0.01 to 0.45 percent by mole in 100 percent by mole of the total structural units of the copolymer (X), and
    in the copolymer (Y),
    at least part of the structural units [C-1'] are structural units derived from 5-ethylidene-2-norbornene (ENB) and the content of structural units derived from ENB is 1 to 5 percent by mole in 100 percent by mole of the total structural units of the copolymer (Y), and
    at least part of the structural units [C-2'] are structural units derived from 5-vinyl-2-norbornene (VNB) and the content of structural units derived from VNB is 0.01 to 0.45 percent by mole in 100 percent by mole of the total structural units of the copolymer (Y).

3. The method according to claim 1, comprising the steps of injecting the rubber composition into a mold by a molding method and performing heating in the mold to induce cross-linking and foaming, thereby manufacturing a cross-linked foam.

\* \* \* \* \*